(12) United States Patent
Julin et al.

(10) Patent No.: US 10,702,441 B2
(45) Date of Patent: Jul. 7, 2020

(54) BALL SCREW AND TENSILE MEMBER EXOSKELETON JOINT ACTUATION DEVICE

(71) Applicant: Ekso Bionics, Inc., Richmond, CA (US)

(72) Inventors: Aaron Julin, Oakland, CA (US); Mike Hughes, Oakland, CA (US)

(73) Assignee: Ekso Bionics, Inc., Richmond, CA (US)

( * ) Notice: Subject to any disclaimer, the term of this patent is extended or adjusted under 35 U.S.C. 154(b) by 408 days.

(21) Appl. No.: 15/499,078

(22) Filed: Apr. 27, 2017

(65) Prior Publication Data

US 2017/0319421 A1    Nov. 9, 2017

Related U.S. Application Data

(60) Provisional application No. 62/331,781, filed on May 4, 2016.

(51) Int. Cl.
*A61H 3/00* (2006.01)
*B25J 9/10* (2006.01)
(Continued)

(52) U.S. Cl.
CPC .............. *A61H 3/00* (2013.01); *B25J 9/0006* (2013.01); *B25J 9/104* (2013.01); *A61H 2201/1207* (2013.01); *A61H 2201/5061* (2013.01); *A61H 2201/5071* (2013.01); *A61H 2205/088* (2013.01); *A61H 2205/10* (2013.01); *F16H 19/0622* (2013.01); *F16H 25/2204* (2013.01); *F16H 2025/2062* (2013.01)

(58) Field of Classification Search
CPC .............. A61H 3/22; A61H 2201/1481; A61H 2201/149; A61B 9/0006; A61B 9/104
See application file for complete search history.

(56) References Cited

U.S. PATENT DOCUMENTS

| 2,855,791 A | 10/1958 | Hogan |
| 3,667,311 A | 6/1972 | Wysong |
| (Continued) | | |

FOREIGN PATENT DOCUMENTS

| CN | 104068985 | 10/2014 |
| CN | 105479485 | 4/2016 |
| CN | 105500343 | 4/2016 |

*Primary Examiner* — Suba Ganesan
(74) *Attorney, Agent, or Firm* — Diederiks & Whitelaw, PLC.

(57) ABSTRACT

An exoskeleton includes first and second supports coupled to an exoskeleton wearer, a joint connecting the first support to the second support and an actuator. The actuator includes a ball screw, a ball nut assembly coupled to the ball screw and first and second tensile members. The ball nut assembly has first and second cord reactors. The first tensile member is routed through the first cord reactor, and the second tensile member is routed through the second cord reactor. Movement of the ball nut assembly along the ball screw in a first direction causes the second support to move relative to the first support in a first rotational direction about the joint. Movement of the ball nut assembly along the ball screw in a second direction causes the second support to move relative to the first support in a second rotational direction about the joint.

20 Claims, 18 Drawing Sheets

(51) Int. Cl.
  *B25J 9/00*    (2006.01)
  *F16H 19/06*    (2006.01)
  *F16H 25/22*    (2006.01)
  *F16H 25/20*    (2006.01)

(56) References Cited

U.S. PATENT DOCUMENTS

| | | |
|---|---|---|
| 4,843,921 A | 7/1989 | Kremer |
| 8,255,079 B2 | 8/2012 | Linn et al. |
| 8,459,139 B2 | 6/2013 | Lee et al. |
| 8,467,903 B2 | 6/2013 | Ihrke et al. |
| 8,635,929 B2 | 1/2014 | Yang et al. |
| 9,011,354 B2 | 4/2015 | Angold et al. |
| 9,060,883 B2 | 6/2015 | Herr et al. |
| 9,149,370 B2 | 10/2015 | Herr et al. |
| 9,427,864 B2 | 8/2016 | Kornbluh et al. |
| 2007/0123997 A1 | 5/2007 | Herr et al. |
| 2010/0312363 A1* | 12/2010 | Herr .......... A61F 2/64 623/39 |
| 2015/0209214 A1 | 7/2015 | Herr et al. |
| 2016/0136811 A1 | 5/2016 | Abroug |
| 2016/0288319 A1 | 10/2016 | Kfoury et al. |
| 2016/0296348 A1 | 10/2016 | Herr et al. |

\* cited by examiner

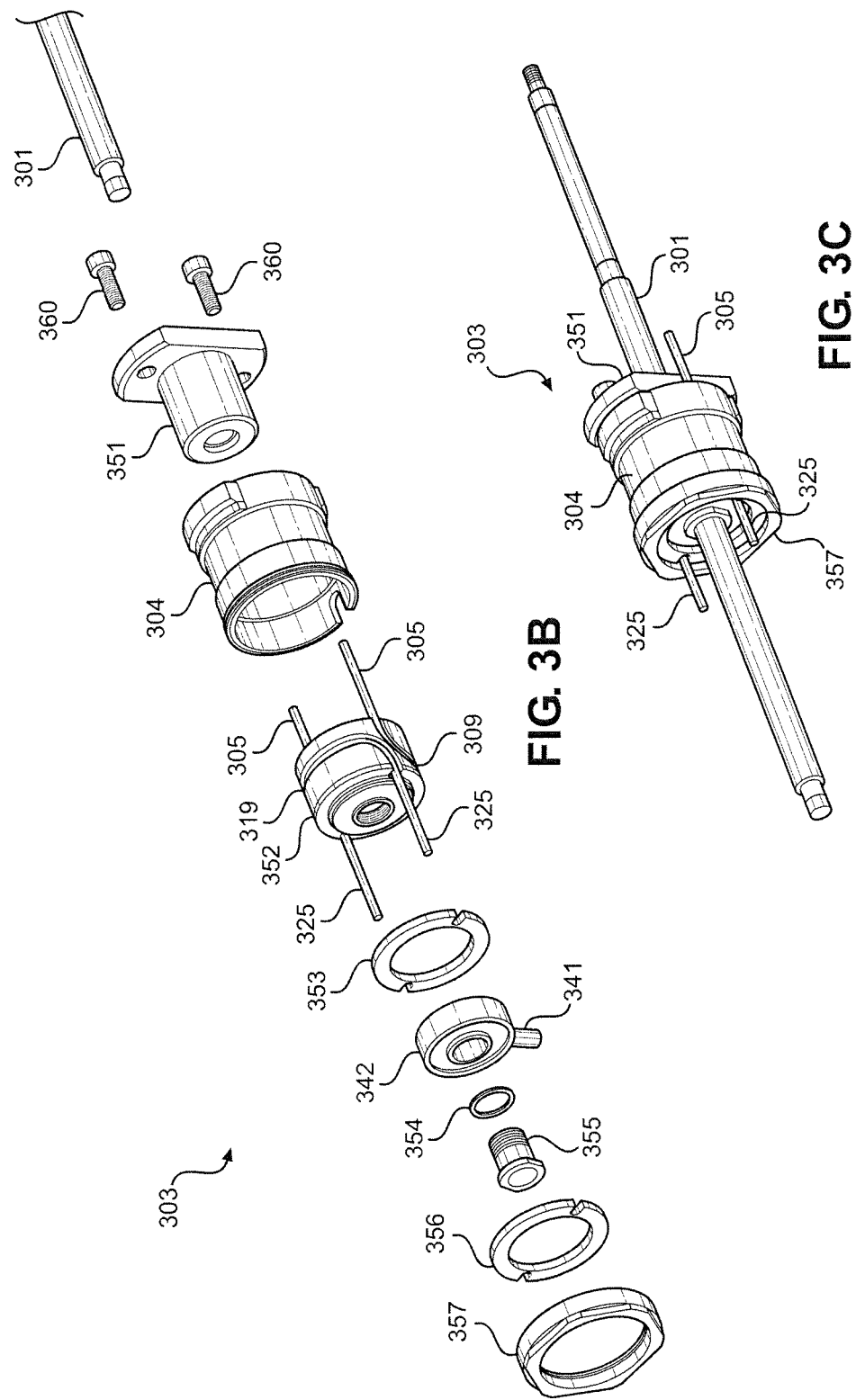

200
BALL SCREW AND TENSILE MEMBER EXOSKELETON JOINT ACTUATION DEVICE

CROSS REFERENCE TO RELATED APPLICATIONS

This application claims the benefit of U.S. Provisional Application No. 62/331,781, which was filed on May 4, 2016 and titled "Ball Screw and Tensile Member Exoskeleton Joint Actuation Device". The entire content of this application is incorporated herein by reference.

GOVERNMENT LICENSE RIGHTS

This invention was made with government support under Contract H92222-15-C-0025 awarded by the United States Special Operations Command. The government has certain rights in the invention.

FIELD OF THE INVENTION

The present invention relates to a device that augments a user's strength and/or aids in the prevention of injury during the performance of certain motions or tasks. More particularly, the present invention relates to a device suitable for therapeutic use with patients that have impaired neuromuscular/muscular function of the appendages or a device suitable for use by a person engaging in heavy tool use or weight bearing tasks. These devices include a set of artificial limbs, with these artificial limbs being movable by actuators under the direction of control systems, that potentiate improved function of the person's appendages for activities including, but not limited to, enabling walking for a disabled person, granting greater strength and endurance in a wearer's arms, or allowing for more weight to be carried by a wearer while walking.

BACKGROUND OF THE INVENTION

Wearable exoskeletons have been designed for medical, commercial, and military applications. Medical exoskeleton devices are being developed to restore and rehabilitate proper muscle function for people with disorders that affect muscle control. Medical exoskeleton devices are a system of motorized braces that can apply forces to the wearer's appendages. In a rehabilitation setting, medical exoskeletons are controlled by a physical therapist who uses one of a plurality of possible input means to command an exoskeleton control system. In turn, the medical exoskeleton control system actuates the position of the motorized braces, resulting in the application of force to, and typically movement of, the body of the exoskeleton wearer. Medical exoskeletons can also be used outside of a therapeutic setting to grant improved mobility to a disabled individual. Commercial and military exoskeletons help prevent injury and augment the exoskeleton wearer's strength. Commercial and military exoskeletons are used to alleviate loads supported by workers or soldiers during their labor or other activities, thereby preventing worker injuries and increasing their stamina and strength. Tool-holding exoskeletons are outfitted with a tool-holding arm that supports the weight of the tool, reducing user fatigue by providing tool-holding assistance. The tool-holding arm transfers the vertical force required to hold the tool through the legs of the exoskeleton rather than through the user's arms and body. Similarly, weight-bearing exoskeletons transfer the weight of the exoskeleton load through the legs of the exoskeleton rather than through the user's legs. In some cases, weight-bearing exoskeletons are designed to carry a specific load, such as a heavy backpack. In other cases, military weight-bearing exoskeletons support the weight of armor. Commercial and military exoskeletons can have actuated joints that augment the strength of the exoskeleton wearer, with these actuated joints being controlled by the exoskeleton control system, and with the exoskeleton wearer using any of a plurality of possible input means to command the exoskeleton control system.

In powered exoskeletons, exoskeleton control systems prescribe and control trajectories in the joints of an exoskeleton, resulting in the movement of the exoskeleton. These control trajectories can be prescribed as position-based, force-based, or a combination of both methodologies, such as those seen in impedance controllers. Position-based control systems can be modified directly through modification of the prescribed positions. Force-based control systems can also be modified directly through modification of the pre-scribed force profiles. Complicated exoskeleton movements, such as walking in an ambulatory medical exoskeleton, are commanded by an exoskeleton control system through the use of a series of exoskeleton trajectories, with increasingly complicated exoskeleton movements requiring an increasingly complicated series of exoskeleton trajectories. These series of trajectories can be cyclic, such as the exoskeleton taking a series of steps with each leg, or they can be discrete, such as an exoskeleton rising from a seated position into a standing position. In the case of an ambulatory exoskeleton, during a rehabilitation session and/or over the course of rehabilitation, it is highly beneficial for the physical therapist to have the ability to modify the prescribed positions and/or the prescribed force profiles depending on the particular physiology or rehabilitation stage of a patient. As various exoskeleton wearers may be differently proportioned, variously adjusted or customized powered exoskeletons will fit each wearer somewhat differently. The exoskeleton control system should take into account these differences in wearer proportion, exoskeleton configuration/customization, and exoskeleton-wearer fit, resulting in changes to prescribed exoskeleton trajectories.

While exoskeleton control systems assign trajectories to the joints of the exoskeleton and control the positions of these joints, the actual forces applied to exoskeleton joints are exerted by actuators. These actuators can take many forms, as is known in the art, each with advantages and disadvantages in various applications. In current exoskeletons, the actuator exerting force on a joint is typically constituted by an electric motor located proximal to that joint. Co-location of the actuator with the joint has advantages in terms of mechanical and design simplicity, but it has certain disadvantages—foremost among them is that adding an electric motor to a joint increases the bulk of the joint, limiting maneuverability of the joint and exoskeleton in certain environments. In comparison, consider a human finger: the musculature exerting force on the joints of the finger is not located near the joints of the finger but rather in the forearm, with muscular contraction pulling on tendons that relay that force over distance to the joints of the finger. This has the advantage of minimizing the bulk of the fingers, allowing for both greater dexterity and closer placement of the fingers to each other. In addition, more muscle can be located in the arm than would fit on the fingers, allowing for greater strength. One mechanical actuation device, described in U.S. Pat. No. 4,843,921, uses a drive mechanism in which an electric motor twists on a loop of cord, with this cord loop forming a helical structure and shortening as it is twisted, causing the length of cord to shorten and pull the two ends of the cord loop closer together. In this way, the activation of the electric motor is used to apply a pulling force over distance through the cord loop. This allows for a design in which the motor driving the movement of a joint is located at a position distal from the joint.

In biological joints, muscles exert force by shortening their length, resulting in translation of the tensile member (tendon) exerting force over distance. This differs from the twisting tensile members as seen in motor-and-loop actuators such as that shown in U.S. Pat. No. 4,843,921. One disadvantage of using such actuators for larger joints in the human exoskeleton, such as the knee or hip, is that even high tensile strength cord, after being twisted and untwisted many times, or having been subject to stress from a fall or misstep, may be at risk of breakage, with such a failure resulting in uncontrolled joint movement. Further, regulatory bodies, such as the Food and Drug Administration, require that medical devices comply with safety guidelines—without addressing the risks of such a design, such an exoskeleton actuator design is unlikely to be approved for use by these agencies. In military exoskeletons, the failure of a joint may not result in direct injury to the wearer, but any reduced mobility could be dire in a combat situation.

A ball screw is a mechanical device that allows rotational motion to be translated into linear motion. These devices, such as those described in U.S. Pat. Nos. 2,855,791 and 3,667,311, or other forms known in the art, are comprised of a threaded shaft that acts as a raceway for ball bearings and a nut that moves over the ball bearings as it travels along the threaded shaft, with the translation of the ball nut along the length of the shaft being driven by the rotation of the threaded shaft. These devices have mechanisms to allow the recirculation of ball bearings within the ball nut as the ball nut moves along the threaded shaft. Ball screw devices are used in automotive steering, aircraft or missile control surfaces, and robotics systems—including high-precision robotic systems such as those used in semiconductor manufacturing. Ball screws are designed for straight-line axial thrust, with any type of transverse force or side load greatly reducing ball screw life and rapidly decreasing mechanical efficacy prior to failure. To prevent side loads, ball screw actuators include devices such as precision rails and/or linear bearings, or other similar devices known in the art. The devices to prevent side load tend to be substantial in relation to the ball screw, increasing the size and weight of an actuator system (both undesirable characteristics in exoskeleton applications).

It is conceivable that an exoskeleton actuator could be developed that combines the linear motion (and high efficiency) of a ball screw system with the force-transfer-over-distance features of tensile member actuators. Such a system would allow the electric motors and other components of the ball screw to be placed away from the joint, and the linear motion of the ball screw would allow the tensile members to transfer force by translating rather than twisting, resulting in decreased wear. However, a number of disadvantages to such a design exist as well. First, the mechanisms of most robotic/exoskeleton actuators allow the actuator to exert force in two joint movement directions, those being flexion and extension in the case of the knee. However, a tensile member is only able to transfer force through a pulling motion, allowing force to be applied to a joint and effecting motion in only one direction. While some exoskeleton joint actuators have used springs or other similar devices to cause a joint to return to a position when the current to the motor is disengaged, this is not suitable for the forces required to move the large joints of a human exoskeleton and/or the body of the wearer.

There exists an unmet need for a device for use in human exoskeletons that allows for force to be exerted on a joint, effecting bidirectional movement of the joint, with this device being located away from the joint. There further exists a need for this device to be highly efficient at the transfer of force from an electrical motor or other power source to the joint, minimizing energy consumption and/or maximizing force applied to the joint. There further exists a need for this device to be low profile and add little bulk at the joint being powered. There further exists a need for this device to incorporate a robust and simple system for force sensing, allowing the exoskeleton control system to accurately control the position and force applied to the joint.

SUMMARY OF THE INVENTION

The present invention is directed to an exoskeleton comprising a first support configured to be coupled to an exoskeleton wearer, a second support configured to be coupled to the exoskeleton wearer, a joint connecting the first support to the second support and an actuator. The actuator includes a ball screw, a ball nut assembly coupled to the ball screw for movement along the ball screw, a first tensile member and a second tensile member. The ball nut assembly has a first cord reactor and a second cord reactor. The first tensile member is routed through the first cord reactor, and the second tensile member is routed through the second cord reactor. The actuator is configured such that movement of the ball nut assembly along the ball screw in a first direction causes the second support to move relative to the first support in a first rotational direction about the joint. Movement of the ball nut assembly along the ball screw in a second direction causes the second support to move relative to the first support in a second rotational direction about the joint.

The joint includes a joint pulley. The joint is configured such that rotation of the joint pulley causes the second support to move relative to the first support about the joint. The first tensile member is coupled to the joint pulley, and the second tensile member is coupled to the joint pulley. Specifically, the first tensile member has a first end and a second end, and the first and second ends of the first tensile member are coupled to the joint pulley. The second tensile member has a first end and a second end, and the first and second ends of the second tensile member are coupled to the joint pulley.

The actuator further includes a first plurality of pulleys configured to guide the first tensile member and a second plurality of pulleys configured to guide the second tensile member. The first tensile member runs parallel to the ball screw between the ball nut assembly and each of the first plurality of pulleys. The second tensile member runs parallel to the ball screw between the ball nut assembly and each of the second plurality of pulleys. In one embodiment, the actuator further includes an additional pulley configured to guide the first tensile member. Each of the first plurality of pulleys is oriented in a first plane, and the additional pulley is oriented in a second plane.

The actuator further includes a motor configured to cause rotation of the ball screw. In one embodiment, the first support is a torso brace, the second support is an upper leg support and the joint is a hip joint. Preferably, the ball nut assembly has a load cell configured to detect a force applied to the ball nut assembly by the first or second tensile member.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 3B is an exploded view of the ball nut assembly of FIG. 3A.

FIG. 3C is an assembled view of the ball nut assembly of FIG. 3A.

DETAILED DESCRIPTION OF THE PREFERRED EMBODIMENTS

Figure 1:
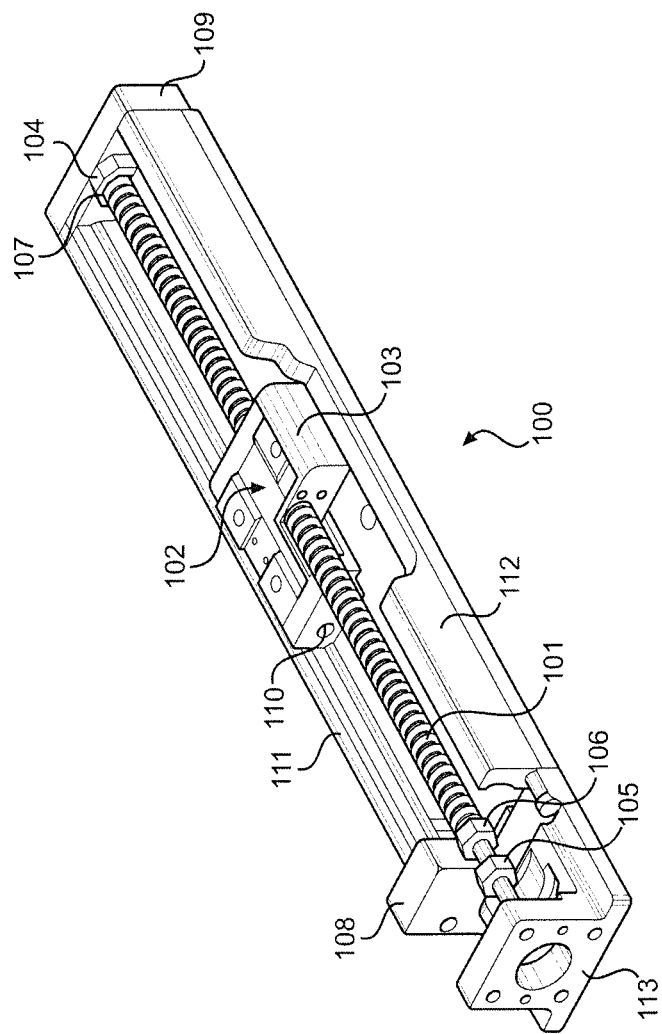
FIG. 1 is a perspective view of a conventional ball screw linear actuator.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

It is an object of the present invention to provide a device that allows for force to be exerted upon an exoskeleton joint by a motor that is located at some distance from the joint, with this device affecting bidirectional movement of the exoskeleton joint.

It is an additional object of the present invention to provide a low-profile device that allows for force to be exerted upon an exoskeleton joint by a motor that is located at some distance from the joint, resulting in a less bulky, more maneuverable exoskeleton joint.

It is an additional object of the present invention to provide a device that allows for force to be exerted upon an exoskeleton joint by a motor that is located at some distance from the joint, with this device being mechanically efficient in the transfer of force from the motor to the exoskeleton joint.

It is an additional object of the present invention to provide a device that allows for force to be exerted upon an exoskeleton joint by a motor that is located at some distance from the joint, with this device of low weight.

It is an additional object of the present to provide a device that allows for force to be exerted upon an exoskeleton joint by a motor that located at some distance from the joint, with this device incorporating a simple and robust force sensing mechanism that improves the ability of the exoskeleton control system and exoskeleton wearer to control the joint being powered.

Concepts were developed for an exoskeleton joint actuator device where the actuator's main drive mechanism is a ball screw, with this ball screw being driven by an electrical motor, and with the ball nut of this device being attached to two opposing sets of cord loops. The cords of these loops are routed through a system of guide pulleys, with the ends of the cord loops being affixed to opposing sides of a joint pulley such that the joint pulley rotates clockwise as one set of cords applies pulling force on the joint pulley, and the joint pulley rotates counterclockwise as the other set of cords applies pulling force on the joint pulley, with both sets of cord loops being held in tension, resulting in the sum of forces on ball nut assembly from the cords being zero. The cords of these loops are configured such that as the ball nut travels axially along the ball screw, a parallel portion of cords translates with the ball nut, resulting in relative shortening of the cords on one side of the joint pulley and relative lengthening of the cords on the opposing side of the joint pulley, with this cord configuration allowing linear movement of the ball nut to be transferred by the cords into rotational movement at the joint. In this way torque applied by the electric motor results in thrust at the ball nut, with this thrust resulting in translation of the cords, with this translation of the cords resulting in torque at the joint pulley. The parallel routing of the cords proximate to the ball screw is such that the cords maintain the axial position of the ball nut along the ball screw, with this preventing side loads on the ball screw, removing the need for guide rails on the ball screw mechanism and reducing the weight of the device.

Concepts were further developed for the inclusion of a load cell in the ball screw and cord loop interacting device, with this load cell providing information to an exoskeleton control system about the bidirectional force being exerted by the actuator device on the joint of the exoskeleton.

Concepts were further developed for use of the ball screw and tensile member actuation device to power the hip joint of a human exoskeleton, with this device being low profile at the hip, with the majority of the device being located on the rear of the exoskeleton.

Based on these concepts, prototype human exoskeleton hip actuation devices were developed, with these devices being comprised of electrically driven ball screw mechanisms mounted on the rear of an exoskeleton, with the linear movement of the ball nut resulting in translation of tensile members, with these tensile members being routed through a series of guide pulleys onto a hip joint pulley such that the bidirectional linear movement of the ball nut along the ball screw results in bidirectional rotational movement at the hip joint. A load cell is incorporated into the ball nut, with this load cell being in communication with the exoskeleton control system, with the exoskeleton control system also being in communication with the electrical motors that drive the ball screw mechanism. In order to power both hips of the exoskeleton, these prototypes contain two actuator devices, with the electric motor and ball screw of the mechanism of each actuator being affixed to the rear of the exoskeleton in an over-under configuration to minimize bulk.

With reference to FIG. 1, an example of a conventional ball screw linear actuator is shown. Specifically, a linear actuator 100 has a ball screw 101, with ball screw 101 being rotatably connected to a rear actuator housing 109 by a rear bearing 104 and a front actuator housing 108 by a front bearing 105. A ball nut 102 travels along ball screw 101 between a rear stopper 107 and a front stopper 106. Ball nut 102 has a ball bearing recirculation mechanism 103 and a grease nipple 110. Ball nut 102 is guided along ball screw 101 between an outer precision rail 111 and an inner precision rail 112. A motor (not shown) can be attached to linear actuator 100 at a motor mount 113, with such a motor driving the rotation of ball screw 101. The rotation of ball screw 101 results in the movement of ball nut 102 along ball screw 101 between outer precision rail 111 and inner precision rail 112. As ball nut 102 moves along ball screw 101, ball bearings (not shown) roll between ball screw 101 and ball nut 102, with ball nut recirculation mechanism 103 returning the ball bearings to ball nut 102, while grease nipple 101 providing lubrication for the ball screw mechanism.

The primary embodiment of the present invention is represented in FIGS. 2A-F. Regarding FIGS. 2A and 2B, simplified drawings of the primary embodiment are shown to demonstrate the function of this actuator device in effecting the rotation of a joint. Specifically, an actuator 200 includes a ball screw 201, with ball screw 201 being driven by an electric motor 202 and rotating about a bearing 214. A ball nut assembly 203 travels along the length of ball screw 201 in response to the rotation of ball screw 201, with the rotation of ball screw 201 being effected by motor 202. Ball nut assembly 203 is comprised of a ball nut body 204 and a cord reactor 209. A cord 205 passes through cord reactor 209, with the ends of cord 205 being affixed to a joint pulley body 206 of a joint pulley 215 at cord terminators 207 and 208. Cord 205 is guided between cord reactor 209 and joint pulley 215 by guide pulleys 211 and 212 such that the portions of cord 205 that extend along the length of ball screw 201 are parallel with ball screw 201. Joint pulley body 206 of joint pulley 215 rotates about a pivot 210, with a joint extension 213 protruding from the structure of joint pulley 215.

Engaging motor 202 causes ball screw 201 to rotate, which causes ball nut assembly 203 to translate linearly along the length of ball screw 201. FIG. 2B shows ball nut assembly 203 moving toward motor 202 relative to the position of ball nut assembly 203 shown in FIG. 2A. This movement of ball nut assembly 203 results in cord 205, which is looped through cord reactor 209, being pulled away from joint pulley 215. The tension applied by cord 205 on joint pulley 215 causes rotation of joint pulley 215 about pivot 210 such that the position of joint extension 213 changes from a joint position 216, shown in FIG. 2A, to a joint position 217, shown in FIG. 2B. In this way, rotational force applied by motor 202 is converted into linear movement of ball nut assembly 203, resulting in tension on cord 205 and causing rotational movement at joint pulley 215. Put another way, motor torque is converted to thrust by a ball screw mechanism, and thrust from the ball screw mechanism is converted to torque at joint pulley 215 by a system of tensile members.

Figure 2A:
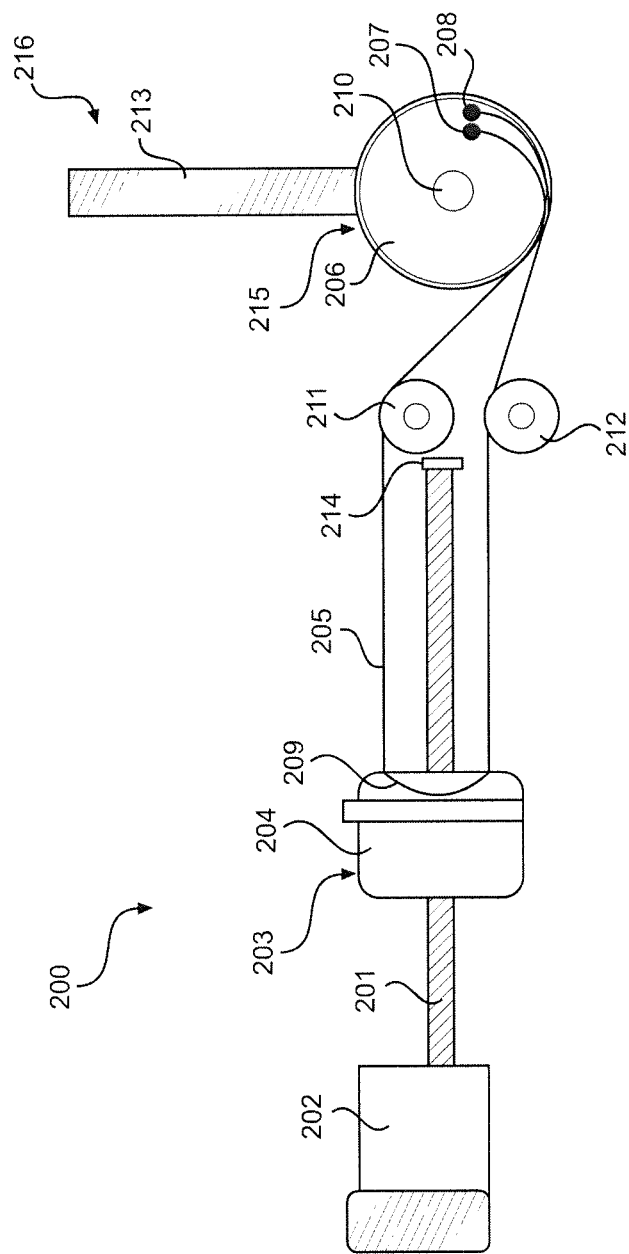
FIG. 2A is a schematic view of one device of the primary embodiment of the present invention, with a ball screw driven by an electric motor effecting rotational movement of a joint pulley through application of force on routed tensile members.
Figure 2B:
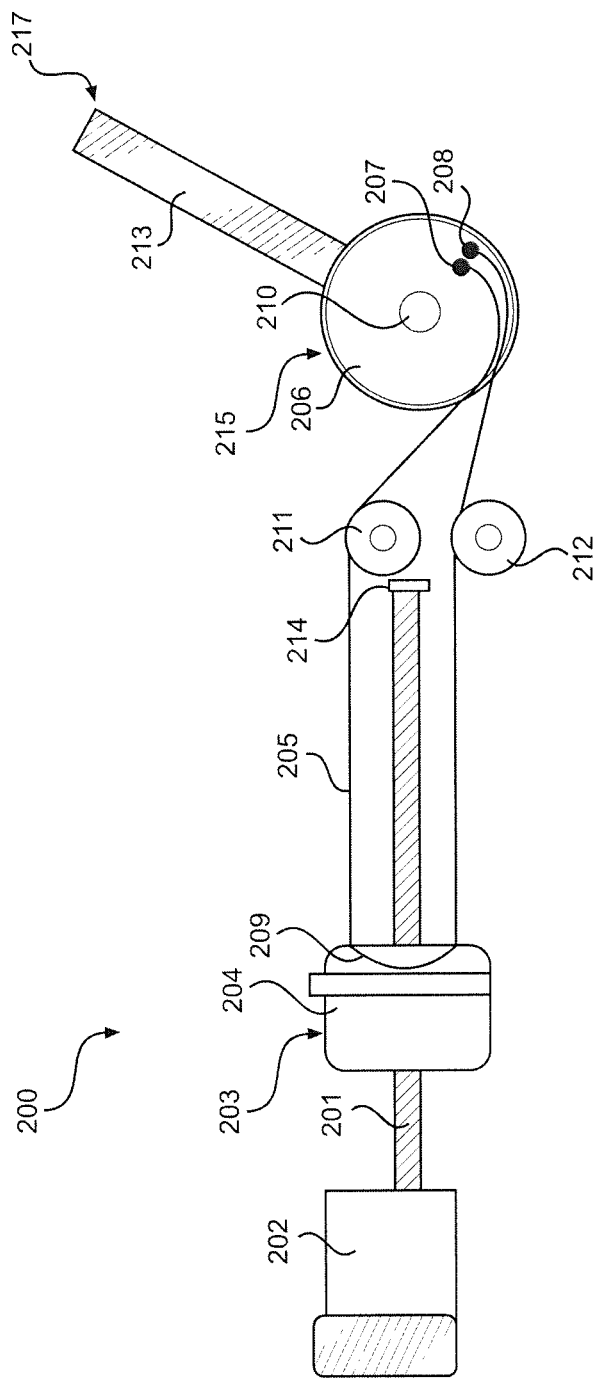
FIG. 2B is a schematic view of the device of FIG. 2A, with this device being shown in a different position relative to that shown in FIG. 2A.
Figure 2C:
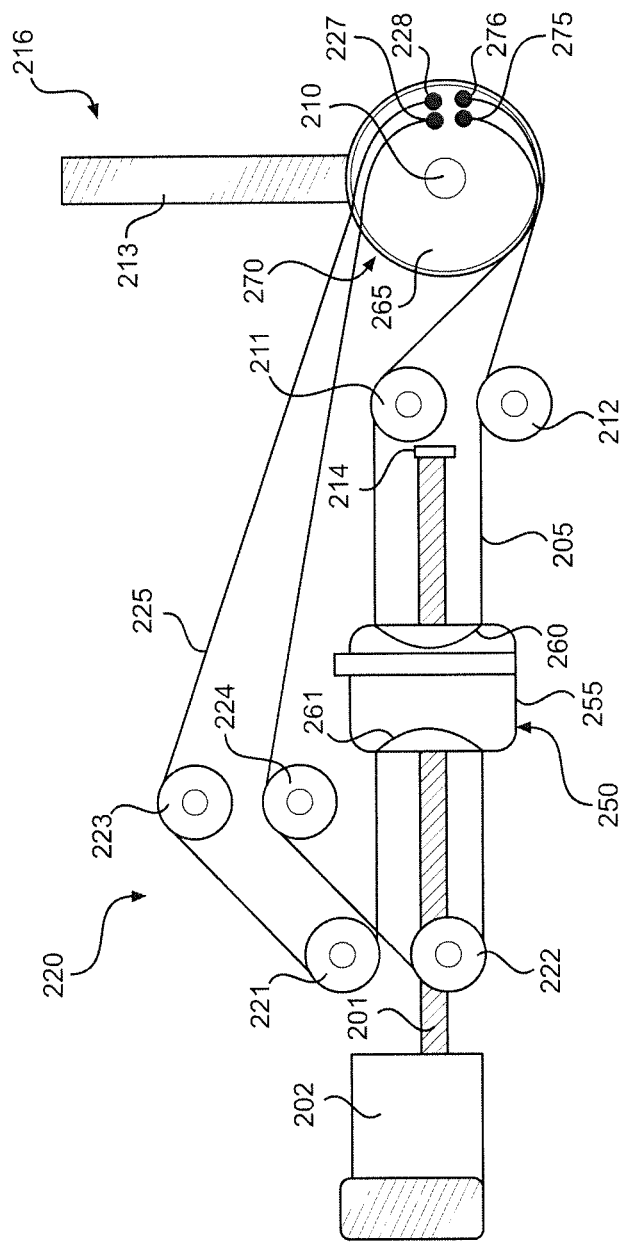
FIG. 2C is a schematic view of one device of the primary embodiment of the present invention, with a ball screw driven by an electric motor effecting bidirectional rotational movement of a joint pulley though application of force on tensile members routed over guide pulleys.
Figure 2D:
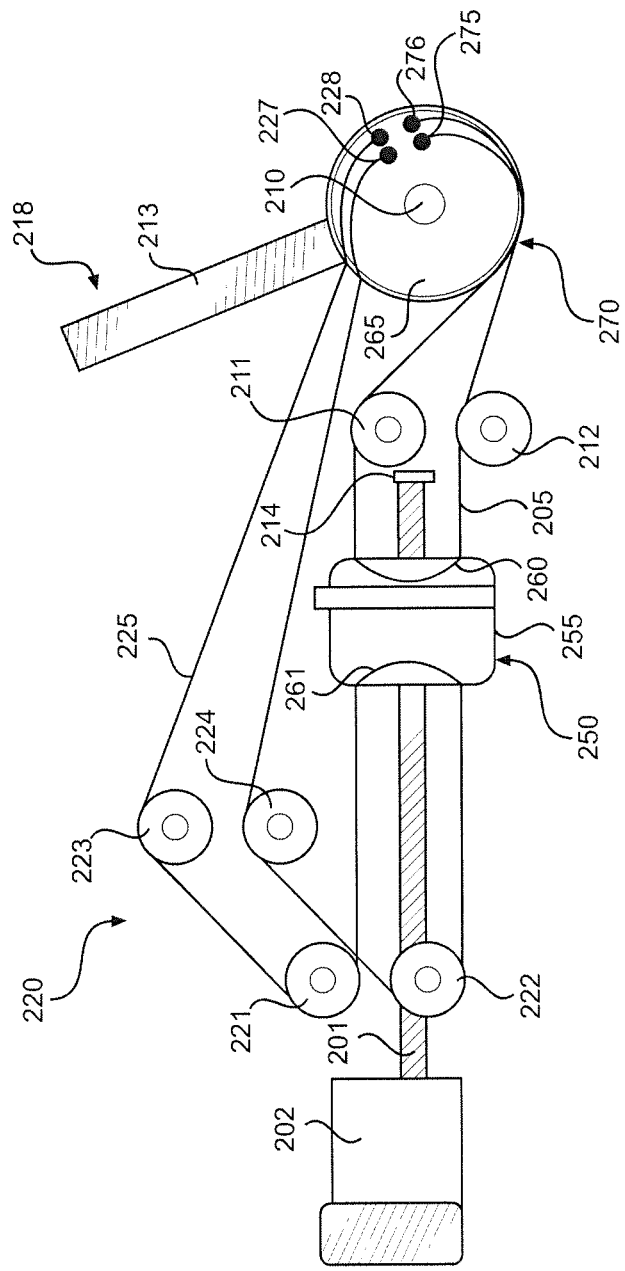
FIG. 2D is a schematic view of the device of FIG. 2C, with this device being shown in a different position relative to that shown in FIG. 2C.

Regarding FIGS. 2C and 2D, the primary embodiment is shown in a configuration that provides for bidirectional motion of the joint pulley, expanding on the mechanism shown in FIGS. 2A and 2B. A bidirectional actuator 220 includes ball screw 201, with ball screw 201 being driven by motor 202 and rotating about bearing 214. A ball nut assembly 250 travels along the length of ball screw 201 in response to the rotation of ball screw 201, with the rotation of ball screw 201 being effected by motor 202. Ball nut assembly 250 is comprised of a ball nut body 255, a first cord reactor 260, and a second cord reactor 261. Cord 205 passes through first cord reactor 260, with the ends of cord 205 being affixed to a joint pulley body 265 of a joint pulley 270 at cord terminators 275 and 276. Cord 205 is guided between first cord reactor 260 and joint pulley 270 by guide pulleys 211 and 212 such that the portions of cord 205 that extend along the length of ball screw 201 are parallel with ball screw 201. A cord 225 passes through second cord reactor 261, with the ends of cord 225 being affixed to joint pulley body 265 of joint pulley 270 at cord terminators 227 and 228. Cord 225 is guided between second cord reactor 261 and joint pulley 270 by guide pulleys 221-224 such that the portions of cord 225 that extend along the length of ball screw 201 are parallel with ball screw 201. Joint pulley body 265 of joint pulley 270 rotates about pivot 210, with joint extension 213 protruding from the structure of joint pulley 270.

Engaging motor 202 causes ball screw 201 to rotate, which causes ball nut assembly 250 to translate linearly along the length of ball screw 201. The direction ball nut assembly 250 travels in is determined by the direction of rotation of ball screw 201. FIG. 2D shows ball nut assembly 250 moving away from motor 202 relative to the position of ball nut assembly 250 shown in FIG. 2C. This movement of ball nut assembly 250 results in cord 225, which is looped through second cord reactor 261, being pulled away from motor 202 such that tension is applied to joint pulley 270 by cord 225. Simultaneously, cord 205, which is looped through first cord reactor 260, is moved toward and wrapped around joint pulley 270, with this movement preventing tension from being applied to joint pulley 270 by cord 205. The net result of these changes in applied force to joint pulley 270 is the rotation of joint pulley 270 about pivot 210, which causes the position of joint extension 213 to change from joint position 216, shown in FIG. 2C, to a joint position 218, shown in FIG. 2D. If actuator 220 is configured such that both cords 205, 225 are held in relative tension, as shown in FIGS. 2C and 2D, any movement of ball nut assembly 250, as driven by motor 202 rotating ball screw 201, will result in movement of joint pulley 270, allowing bidirectional control of the rotation of joint pulley 270 by a bidirectional motor (i.e., motor 202).

Figure 2E:
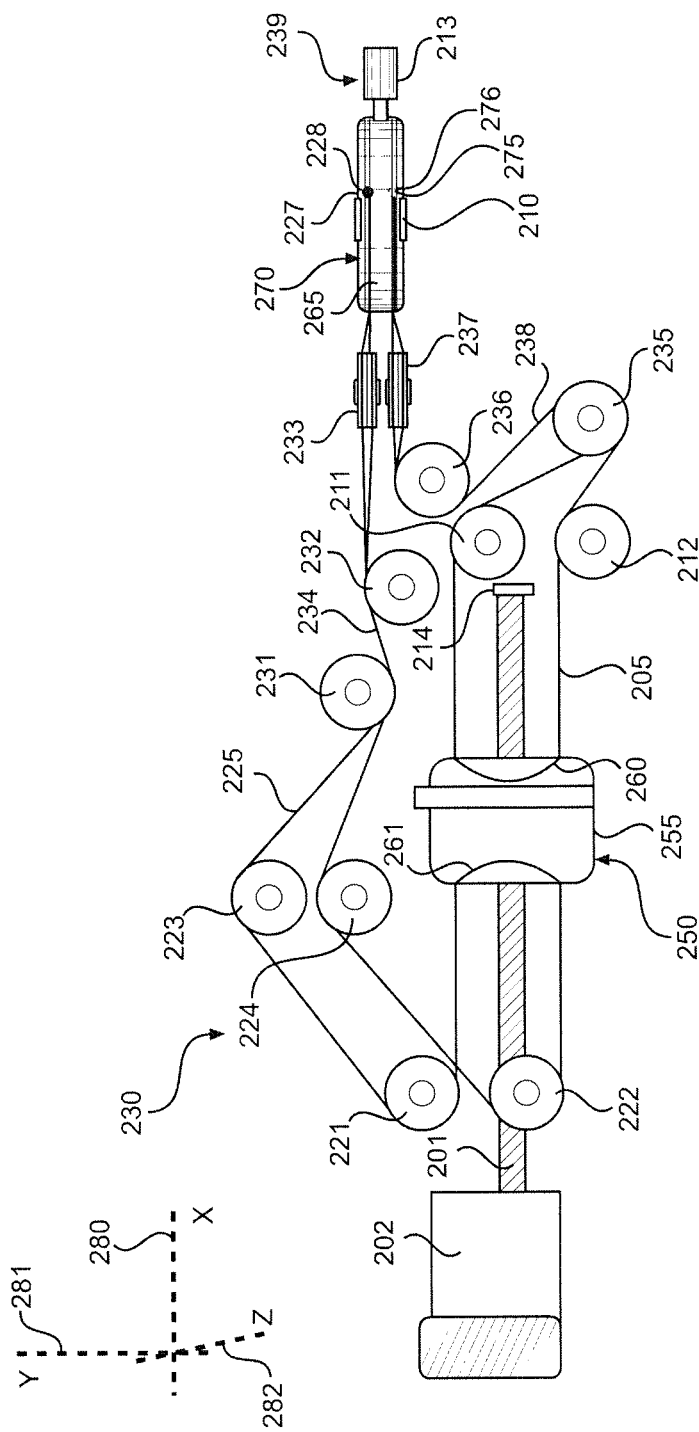
FIG. 2E is a schematic view of a more complex version of one device of the primary embodiment of the present invention, with a ball screw driven by an electric motor effecting bidirectional rotational movement of a joint pulley though application of force on routed tensile members, with the tensile members being routed over pulleys and exerting force in multiple planes.
Figure 2F:
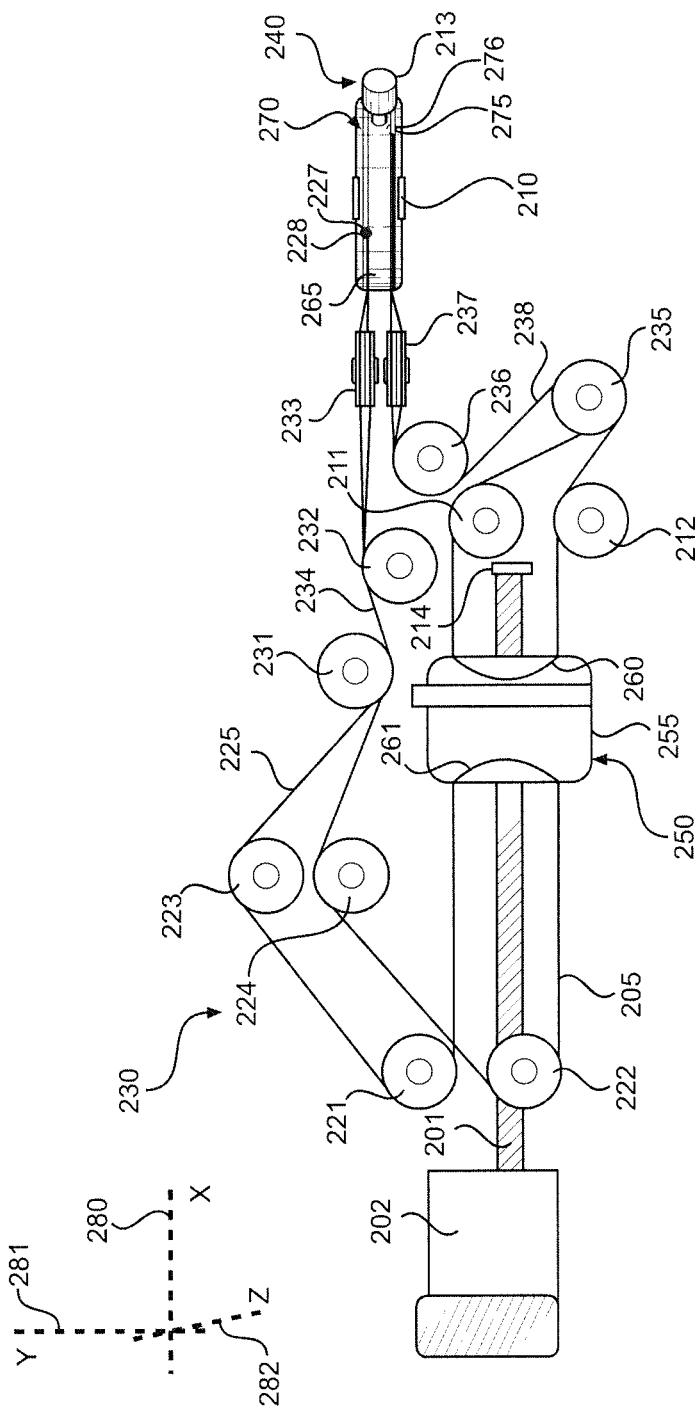
FIG. 2F is a schematic view of the device of FIG. 2E, with this device being shown in a different position relative to that shown in FIG. 2E.

In FIGS. 2E and 2F, a somewhat more complex configuration of the first embodiment is shown. This configuration uses additional guide pulleys, including pulleys that guide both sides of a cord concurrently and pulleys that guide the cord into another plane. In FIGS. 2E and 2F, a bidirectional actuator 230 includes ball screw 201, with ball screw 201 being driven by motor 202 and rotating about bearing 214. Ball nut assembly 250 travels along the length of ball screw 201 in response to the rotation of ball screw 201, with the rotation of ball screw 201 being effected by motor 202. Ball nut assembly 250 is comprised of ball nut body 255, first cord reactor 260, and second cord reactor 261. Cord 205 passes through first cord reactor 260, with the ends of cord 205 being affixed to joint pulley body 265 of joint pulley 270 at cord terminators 275 and 276. Cord 205 is guided between first cord reactor 260 and joint pulley 270 by guide pulleys 211, 212, and 235-237. The portions of cord 205 located on opposite sides of first cord reactor 260 are routed close to one another in a paired strand length 238 between guide pulley 235 and joint pulley 270. Also, the portions of cord 205 that extend along the length of ball screw 201 are parallel with ball screw 201. Cord 225 passes through second cord reactor 261, with the ends of cord 225 being affixed to joint pulley body 265 of joint pulley 270 at cord terminators 227 and 228. Cord 225 is guided between second cord reactor 261 and joint pulley 270 by guide pulleys 221-224 and 231-233. The portions of cord 225 located on opposite sides of second cord reactor 261 are routed close to one another in a paired strand length 234 between guide pulley 231 and joint pulley 270. Also, the portions of cord 225 that extend along the length of ball screw 201 are parallel with ball screw 201.

To facilitate description, FIGS. 2E and 2F include a coordinate system with an X-axis labeled 280, a Y-axis labeled 281, and a Z-axis labeled 282. All guide pulleys are oriented in the X-Y plane other than guide pulleys 233 and 237. Guide pulleys 233 and 237 are oriented in the X-Z plane to guide cords 225 and 205, respectively, onto joint pulley 270, which is also oriented in the X-Z plane. Joint pulley body 265 of joint pulley 270 rotates about pivot 210, with joint extension 213 protruding from the structure of joint pulley 270. In this configuration, movement of ball nut assembly 250 in the X-direction along ball screw 201 results in rotation of joint pulley 270 in the X-Z plane. Accordingly, when ball nut assembly 250 moves from the position shown in FIG. 2E to the position shown in FIG. 2F, joint extension 213 moves from a joint position 239, shown in FIG. 2E, to a joint position 240, shown in FIG. 2F. The configuration of FIGS. 2E and 2F can be modified in accordance with the present invention, with differing numbers and orientations of guide pulleys transferring a force from a ball screw actuator to a joint pulley in any of a range of planes or at various distances from the actuator. In some embodiments, tensile member guides other than pulleys are used. In one preferred embodiment, cords 205 and 225 are high-strength and/or zero-creep cords. In some embodiments, tensile members other than cords are used, e.g., metal cables.

As an example of the primary embodiment of the present invention, consider a soldier wearing a powered exoskeleton in a combat environment, with this exoskeleton providing power to the joints of the exoskeleton that are involved in exoskeleton walking. If this exoskeleton were equipped with the device of the primary embodiment, power could be provided to the joints of the exoskeleton, such as the hip, without adding bulk to the joint. This is useful to a person wearing an exoskeleton that needs to move through tight spaces, where bulky joints could snag on obstacles such as walls or brush and obstruct the passage of the exoskeleton. Through use of the device of the primary embodiment on one or more exoskeleton leg joints, leg joint bulk would be reduced, improving the mobility and maneuverability of the exoskeleton in tight spaces or cluttered environments. In addition, as the tensile members of the device of the primary embodiment stabilize the axial position of the ball nut assembly on the ball screw, a heavy precision rail is not required in this type of ball screw linear actuator, reducing the weight and bulk of the actuator and exoskeleton as a whole—with lighter weight being desirable in exoskeletons for reasons including exoskeleton speed and power consumption.

Figure 3A:
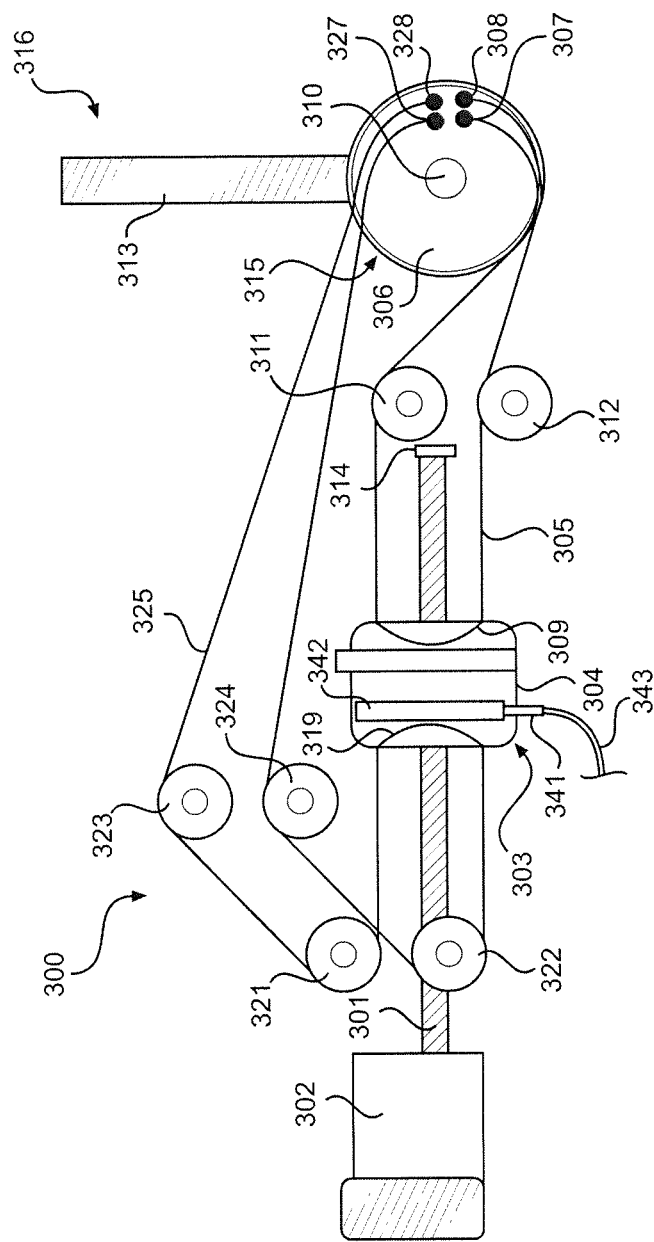
FIG. 3A is a schematic view of one device of the second embodiment of the present invention, with a ball screw driven by an electric motor effecting bidirectional rotational movement of a joint pulley though application of force on routed tensile members, with a ball nut assembly incorporating a force sensing device.

The second embodiment of the present invention is shown in FIGS. 3A-C. Regarding FIG. 3A, an actuator 300 is shown, with actuator 300 including a ball screw 301. Ball screw 301 is driven by an electric motor 302 and rotates about a bearing 314. A ball nut assembly 303 travels along the length of ball screw 301 in response to the rotation of ball screw 301, with the rotation of ball screw 301 being effected by motor 302. In FIG. 3A, ball nut assembly 303 is shown being comprised of a ball nut body 304, a first cord reactor 309, a second cord reactor 319, a load cell 342, a load cell interface port 341, and a data cable 343. Data cable 343 connects to the exoskeleton control system or another sensor or control system (not shown). A cord 305 passes through first cord reactor 309, with the ends of cord 305 being affixed to a joint pulley body 306 of a joint pulley 315 at cord terminators 307 and 308. Cord 305 is guided between first cord reactor 309 and joint pulley 315 by guide pulleys 311 and 312 such that the portions of cord 305 that extend along the length of ball screw 301 are parallel with ball screw 301. A cord 325 passes through second cord reactor 319, with the ends of cord 325 being affixed to joint pulley body 306 of joint pulley 315 at cord terminator 327 and cord terminator 328. Cord 325 is guided between second cord reactor 319 and joint pulley 315 by guide pulleys 321-324 such that the portions of cord 325 that extend along the length of ball screw 301 are parallel with ball screw 301. Joint pulley body 306 of joint pulley 315 rotates about a pivot 310, with a joint extension 313 protruding from the structure of joint pulley 315. Engaging motor 302 causes ball screw 301 to rotate, which causes ball nut assembly 303 to translate linearly along the length of ball screw 301. The direction ball nut assembly 303 travels in is determined by the direction of rotation of ball screw 301. Movement of ball nut assembly 303 causes joint pulley body 306 to rotate about pivot 310 such that the position of joint extension 313 changes.

FIGS. 3B and 3C represent exploded and assembled views, respectively, of ball nut assembly 303. In contrast with FIG. 3A, which is a schematic view, FIGS. 3B and 3C provide more detailed views of ball nut assembly 303. Ball nut assembly 303 is comprised of a ball nut 351, ball nut body 304, a cord reactor body 352, a load cell ring 353, load cell 342, load cell interface port 341, a washer 354, a load cell shaft 355, and a load cell ring 356. A load cell screwcap 357 and fasteners 360 hold ball nut assembly 303 together. In general, load cells such as load cell 342 have poor overload protection and are prone to damage when overloaded. It is an advantage of the present invention that, as the load on load cell 342 increases and load cell 342 correspondingly deflects, the load will be "grounded" to other parts before load cell 342 fails. For example, when cord 305 is under tension, cord reactor 309 will ground out into flanges internal to ball nut body 304 (not visible). Conversely, when cord 325 is under tension, cord reactor 319 will ground into load cell ring 353, which will ground into the outer (non-load-sensing part) of load cell 342, which will ground into load cell screwcap 357, which finally grounds the load into ball nut body 304 through a threaded connection. Thus, the invention can provide load sensing with inherent overload protection.

In one prototype of the second embodiment, the load cell used was the FUTEK® Model LTH300, a donut load cell, which detects compressive force, although it can be configured, as in the second embodiment, to detect bidirectional force (as described in FUTEK® Doc No. EL1058 regarding Model No. LTH300). The configuration of ball nut assembly 303 is such that, as motor 302 of actuator 300 is engaged to rotate joint 315, load cell 342 detects the force being applied upon cord reactor body 352 due to the tension of cord 305 or cord 325. The forces on cords 305 and 325 are proportional to the forces being applied on joint pulley 315 and joint extension 313, allowing the exoskeleton control system (not shown) to better control the position of the joint, including reducing force to prevent injury to a wearer or increasing force when greater joint assistance is needed. Similarly, load cell 342 can detect forces being exerted upon the joint when actuator 300 and motor 302 are not engaged. In some embodiments, there is a second load cell rather than a single bidirectional load cell. In some embodiments, other types of sensors known in the art are used to detect force at ball nut assembly 303.

As an example of the second embodiment of the present invention, consider a soldier wearing a powered exoskeleton in a combat environment, with this exoskeleton providing power to the joints of the exoskeleton that are involved in exoskeleton walking. The exoskeleton is equipped with the device of the primary embodiment, with the actuator of the primary embodiment providing power to the hips of the exoskeleton. The power provided to the hips of the exoskeleton is controlled by the exoskeleton control system, which uses sensors and a wearer interface to detect the intentions of the soldier wearing the exoskeleton to direct the hip-actuator-effected movements of the hips. However, in some situations, the movement of the legs may be obstructed, such as when the leg of the exoskeleton is blocked in movement by an obstacle or snag. In such a situation, if the actuator continued to apply force on a joint that was unable to move (perhaps even at the command of the exoskeleton wearer), it is possible that components of the exoskeleton actuator (such as cords or other tensile members) or exoskeleton structure could fail, resulting in a disabled exoskeleton—a highly undesirable outcome in a combat setting. Through use of the force-sensing device of the second embodiment, the exoskeleton control system can control the amount of force applied to the joint within preset constraints so as to prevent failure of exoskeleton or actuator components. In addition, force-sensing data provided to the exoskeleton control system from the actuator is useful in coordination of exoskeleton and wearer movements, improving the speed and agility of the exoskeleton and improving the ease of use to the wearer.

Figure 4A:
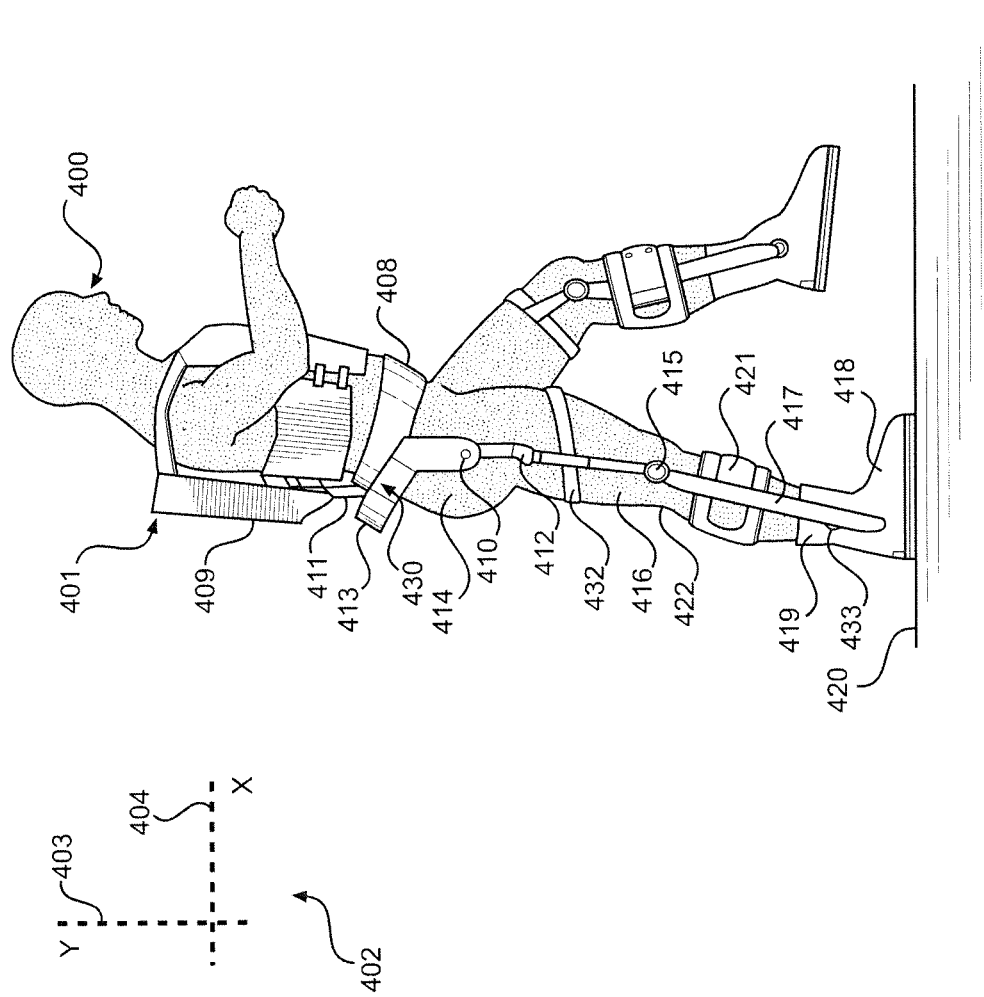
FIG. 4A is a side view of a person wearing an exoskeleton equipped with a hip actuation device of the third embodiment of the present invention.
Figure 4B:
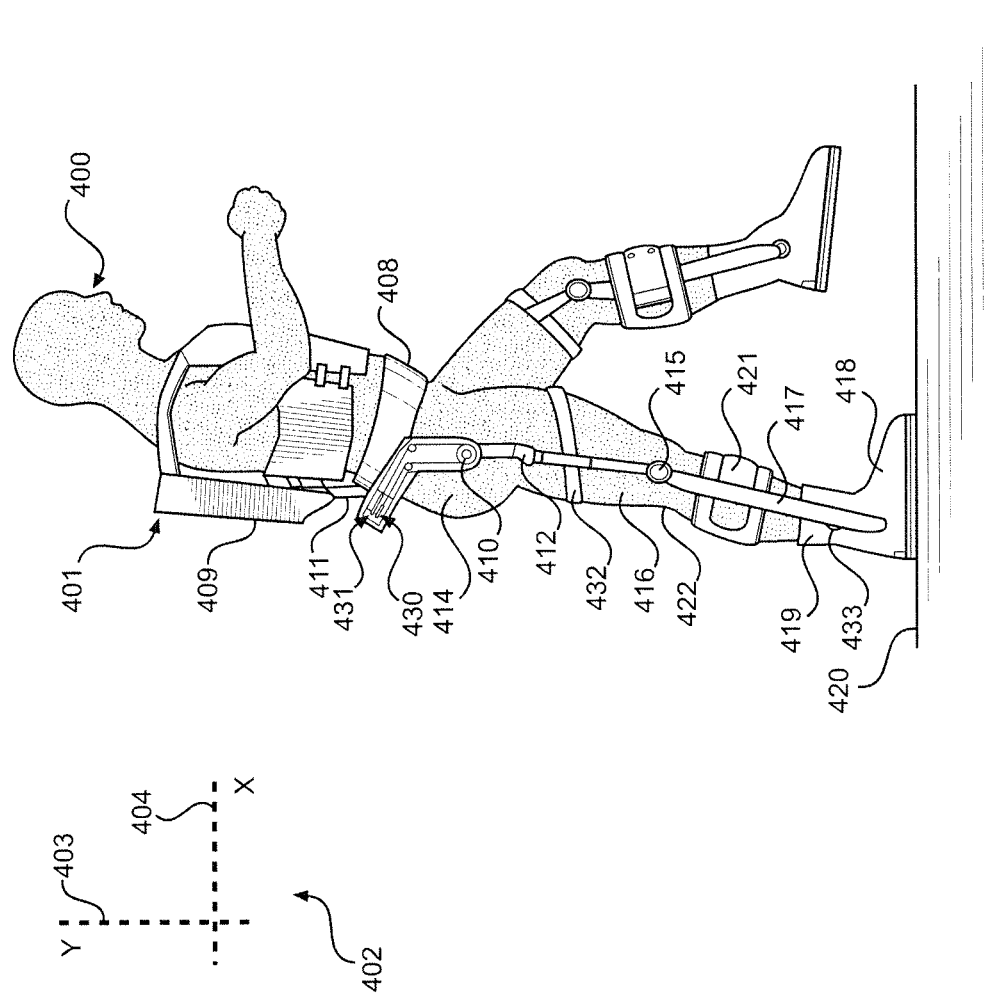
FIG. 4B is a side view of the person and exoskeleton of FIG. 4A showing a cutaway view of the internal components of the hip actuation device.

The third embodiment of the present invention is shown in FIGS. 4A-F. With reference to FIGS. 4A and 4B, a person 400 is wearing an exoskeleton 401. Exoskeleton 401 includes a torso brace 409, with torso brace 409 connecting to a rear mount 411, and with rear mount 411 connecting to strapping 408 and a hip actuator 430. Hip actuator 430 has a cover 413 and internal components 431. Hip actuator 430 is rotatably connected to an upper leg support 412 at a hip joint 410, with upper leg support 412 being rotatably connected to a lower leg support 417 at a knee joint 415, and with lower leg support 417 being rotatably connected to a boot 418 by an ankle joint 433. Hip joint 410 is collocated with a hip 414 of person 400, knee joint 415 is collocated with a knee 416 of person 400, and ankle joint 433 is collocated with an ankle 419 of person 400. Upper leg support 412 and lower leg support 417 are selectively coupled to a leg 422 of person 400 by thigh strapping 432 and shank strapping 421, respectively. The weight of exoskeleton 401 is transferred around person 400, with the weight of torso brace 409 passing through rear mount 411 to hip actuator 430, through upper leg support 412 to lower leg support 417, to boot 418, and ultimately into a support surface 420. FIGS. 4A and 4B show person 400, exoskeleton 401, and hip actuator 430 in an X-Y plane 402 (with X-Y plane 402 being formed by an X-axis 404 and a Y-axis-403).

Figure 4C:
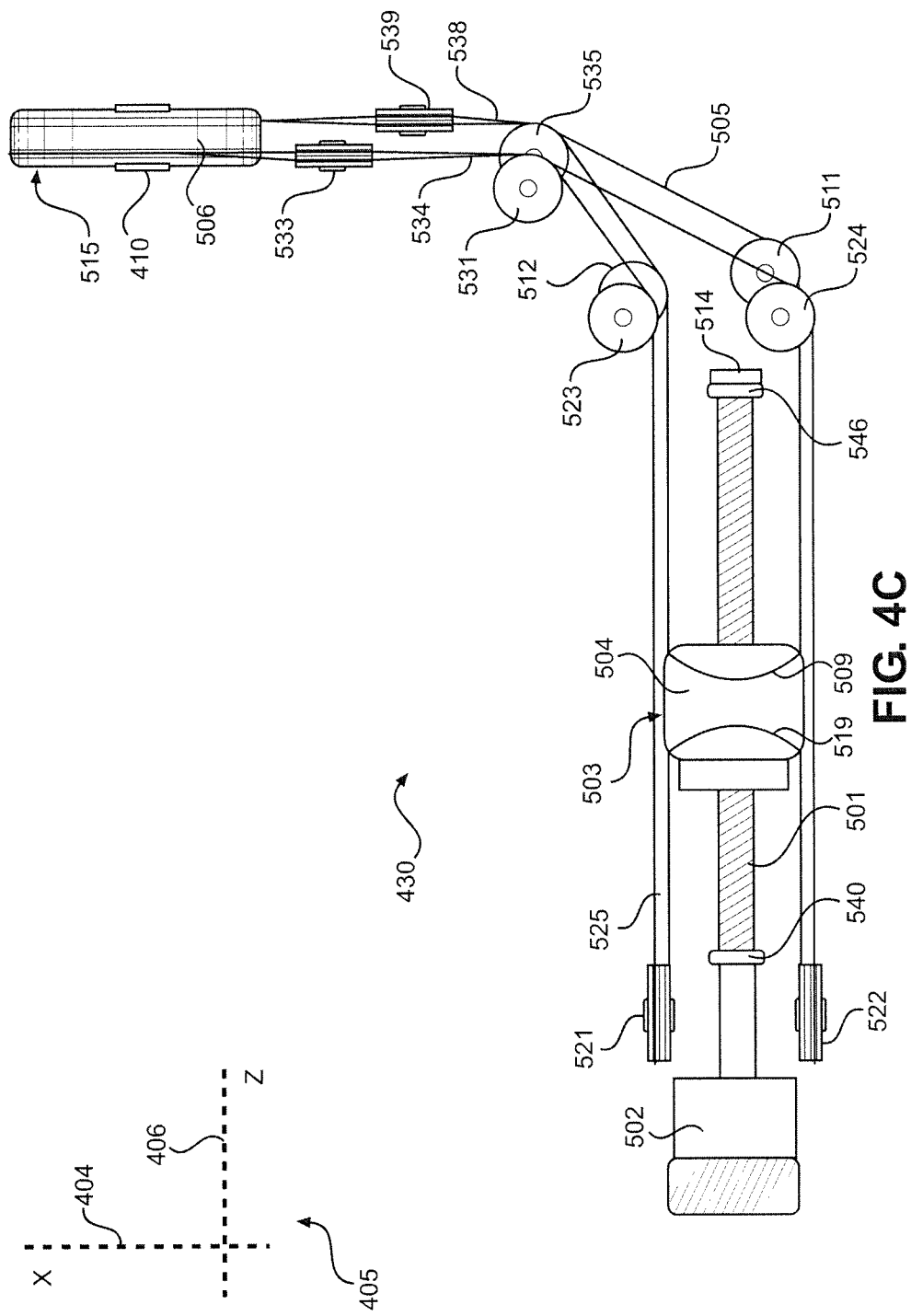
FIG. 4C is a top view of the primary functional components of the hip actuation device of the third embodiment.
Figure 4D:
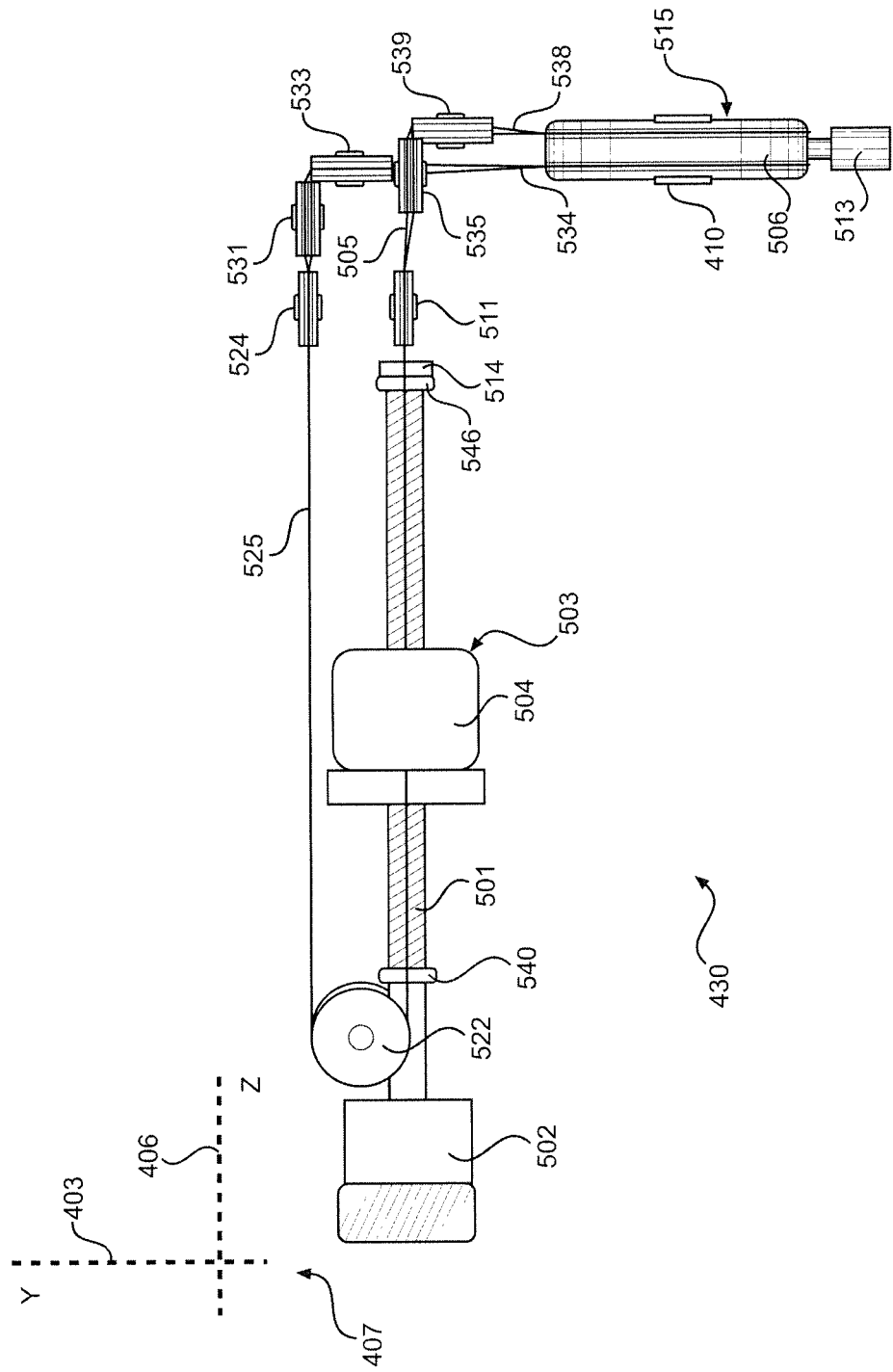
FIG. 4D is a rear view of the primary functional components of the hip actuation device of the third embodiment.
Figure 4E:
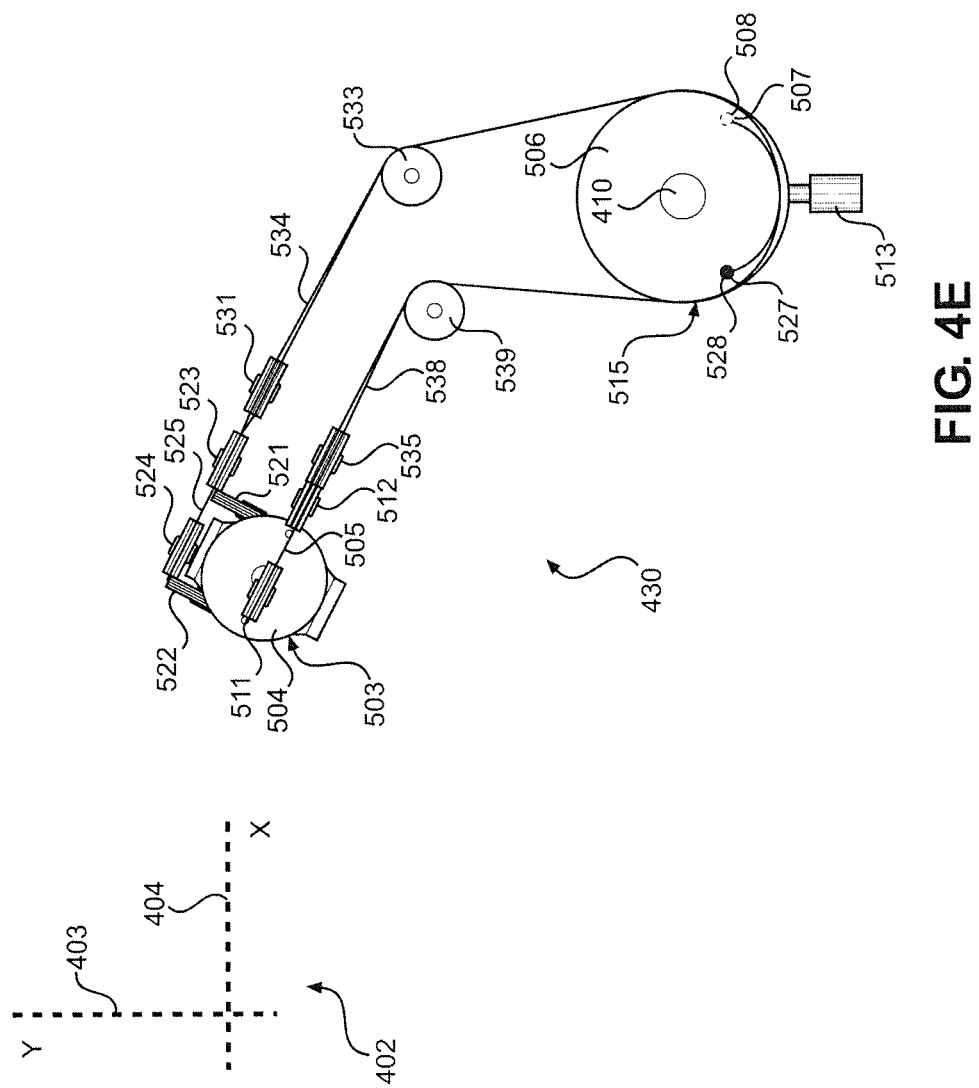
FIG. 4E is a side view of the primary functional components of the hip actuation device of the third embodiment.
Figure 4F:
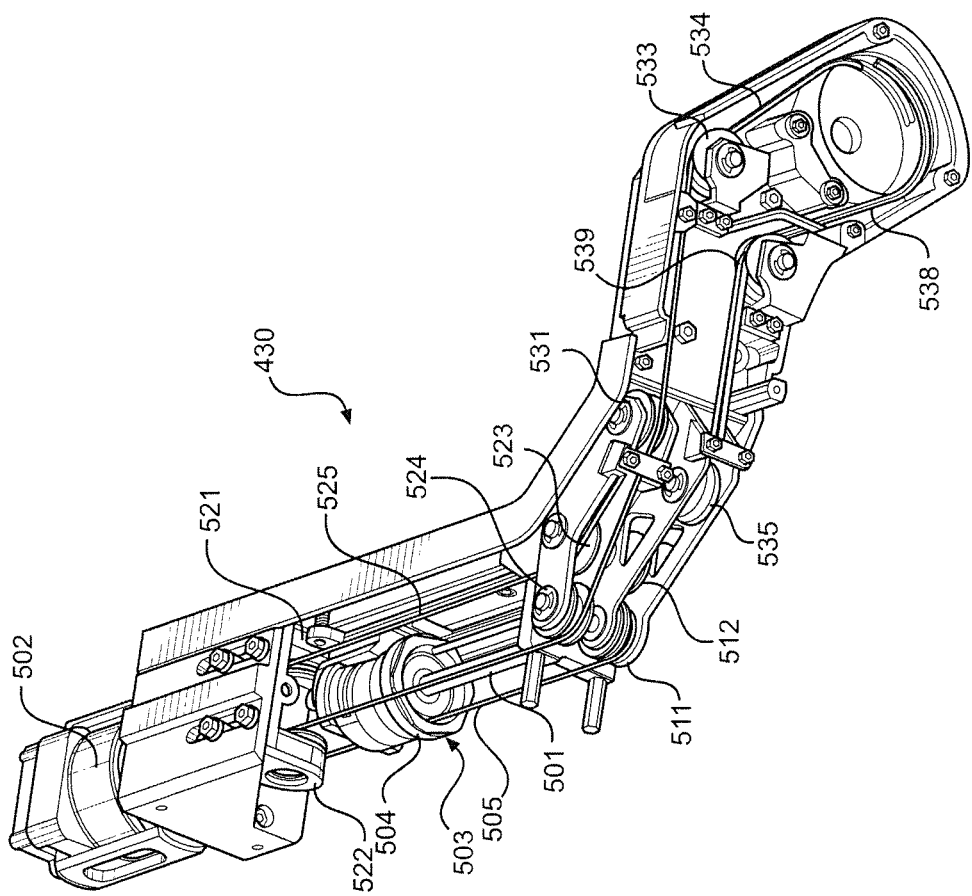
FIG. 4F is a perspective view of the hip actuation device of the third embodiment.
Figure 4F:
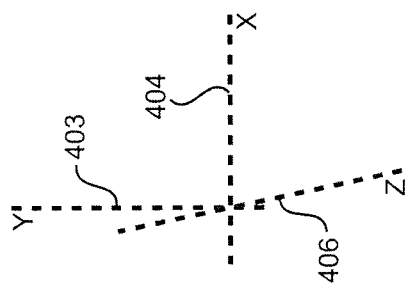

The internal components of the device of the third embodiment of the present invention are shown in greater detail and from a number of perspectives in FIGS. 4C-F. FIG. 4C is an overhead view of hip actuator 430 in an X-Z plane 405 (with X-Z plane 405 being formed by X-axis 404 and a Z-axis 406). FIG. 4D is a rear view of hip actuator 430 in a Y-Z plane 407 (with Y-Z plane 407 being formed by Y-axis 403 and Z-axis 406). FIG. 4E is a side view of hip actuator 430 in X-Y plane 402. FIG. 4F is a detailed view of hip actuator 430. Note that FIG. 4E shows imperfect alignment of some actuator components with the described planes (particularly the relative alignment of X-Y plane 402 with the other planes described); the planes in these figures are shown for explanatory purposes as to the function of the hip actuator device, rather than being intended to rigidly bind components into planes that are at 90-degree angles to each other. In some embodiments, more than three planes can be used to define the position and function of the device.

With reference to FIGS. 4C-F, hip actuator 430 includes a ball screw 501, with ball screw 501 being driven by an electric motor 502 and rotating about a bearing 514. A ball nut assembly 503 travels along the length of ball screw 501, along Z-axis 406, in response to the rotation of ball screw 501, with the rotation of ball screw 501 being effected by motor 502. The movement of ball nut assembly 503 along ball screw 501 is restricted by ball nut assembly stops 540 and 546. Ball nut assembly 503 is comprised of a ball nut body 504, a first cord reactor 509, and a second cord reactor 519. A cord 505 passes through first cord reactor 509, with the ends of cord 505 being affixed to a joint pulley body 506 of a joint pulley 515 at cord terminators 507 and 508. Cord 505 is guided between first cord reactor 509 and joint pulley 515 by guide pulleys 511, 512, 535, and 539. The portions of cord 505 located on opposite sides of first cord reactor 509 are routed close to one another in a paired strand length 538 between guide pulley 535 and joint pulley 515. The portions of cord 505 that extend along the length of ball screw 501 are parallel with ball screw 501. A cord 525 passes through second cord reactor 519, with the ends of cord 525 being affixed to joint pulley body 506 of joint pulley 515 at cord terminator 527 and 528. Cord 525 is guided between second cord reactor 519 and joint pulley 515 by guide pulleys 521-524, 531, and 533. The portions of cord 525 located on opposite sides of second cord reactor 519 are routed close to one another in a paired strand length 534 between guide pulley 531 and joint pulley 515. The portions of cord 525 that extend along the length of ball screw 501 are parallel with ball screw 501. Guide pulleys 511, 512, 523, 524, 531, and 535 rotate in X-Z plane 405. Guide pulleys 521 and 522 rotate in Y-Z plane 407. Guide pulleys 533 and 539, joint pulley 515, motor 502, and ball screw 501 rotate in X-Y plane 402.

Rotation of motor 502 drives the rotation of ball screw 501, effecting linear movement of ball nut assembly 503 along ball screw 501 and Z-axis 406. The linear movement of ball nut assembly 503 results in the translation of cords 505 and 525, with cords 505 and 525 traveling in opposite directions while cords 505 and 525 are parallel to ball screw 501 in Z-axis 406. Relative movement of cords 505 and 525 applies force upon joint pulley 515, resulting in rotation of joint pulley 515 in X-Y plane 402 at hip joint 410, with this causing movement of a joint extension 513 relative to hip joint 410. The movement of joint extension 513 results in movement of upper leg support 412 relative to hip actuator 430. Taken together, motor-effected movement of ball nut assembly 503 to the right along Z-axis 406 (shown in FIG. 4C) results in counterclockwise rotation of joint pulley 515 in X-Y plane 402 (shown in FIG. 4E). This causes flexion of upper leg support 412 of exoskeleton 401 at hip joint 410 and extension of leg 422 of person 400 at hip 414 (shown in FIGS. 4A and 4B). Conversely, if motor 502 were to drive ball screw 501 in the opposite direction, motor-effected movement of ball nut assembly 503 to the left along Z-axis 406 (shown in FIG. 4C) results in clockwise rotation of joint pulley 515 in X-Y plane 402 (shown in FIG. 4E). This causes extension of upper leg support 412 of exoskeleton 401 at hip joint 410 and flexion of leg 422 of person 400 at hip 414 (shown in FIGS. 4A and 4B). In some embodiments, the guide pulleys transferring the force from the ball screw actuator to the joint pulley are arrayed differently and/or in a different number. In some embodiments, tensile member guides other than pulleys are used. In one preferred embodiment, the tensile members are zero-creep cords. In some embodiments, tensile members other than cords are used, e.g., metal cables. In some embodiments, motor 502 is placed in parallel with ball screw 501 rather than in line with it, with rotation of ball screw 501 being driven by a gear, wheel, belt, or other system known in the art. Note that the prototype of the third embodiment also included the load cell device and ball nut assembly device of the second embodiment.

As an example of the third embodiment of the present invention, consider a soldier wearing a powered exoskeleton in a combat environment, with this exoskeleton providing power to the joints of the exoskeleton that are involved in exoskeleton walking. If this exoskeleton were equipped with the hip actuator device of the third embodiment, power could be provided to the hip joint of the exoskeleton without adding bulk to the joint. This is useful to a person wearing an exoskeleton that needs to move through tight spaces, where bulky joints could snag on obstacles such as walls or brush and obstruct the passage of the exoskeleton. Through use of the device of the third embodiment of the exoskeleton hip joint, hip joint bulk would be reduced, improving the mobility and maneuverability of the exoskeleton in tight spaces or cluttered environments. In addition, as the tensile members of the device of the third embodiment stabilize the axial position of the ball nut assembly on the ball screw, a heavy precision rail is not required in this type of ball screw linear actuator, reducing the weight and bulk of the actuator and exoskeleton as a whole—with lighter weight being desirable in exoskeletons for reasons including exoskeleton speed and power consumption. An additional advantage of this actuator design is that it results in efficient electric actuation at the hip, in large part due to the mechanical efficiency of the ball screw actuator, with this efficient actuation increasing the range and/or speed of a powered exoskeleton.

Figure 5A:
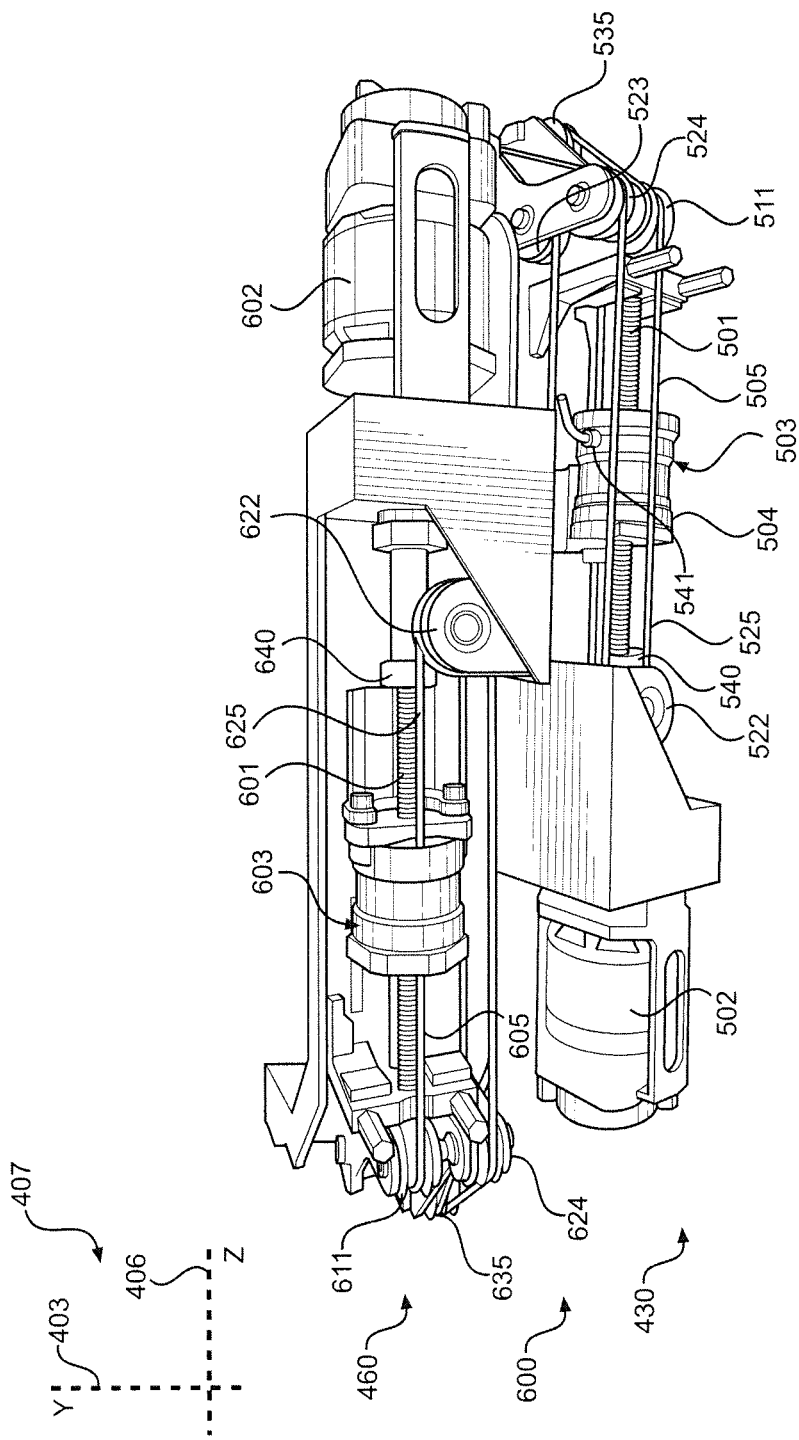
FIG. 5A is a rear profile view of a hip actuation device of the fourth embodiment of the present invention.
Figure 5B:
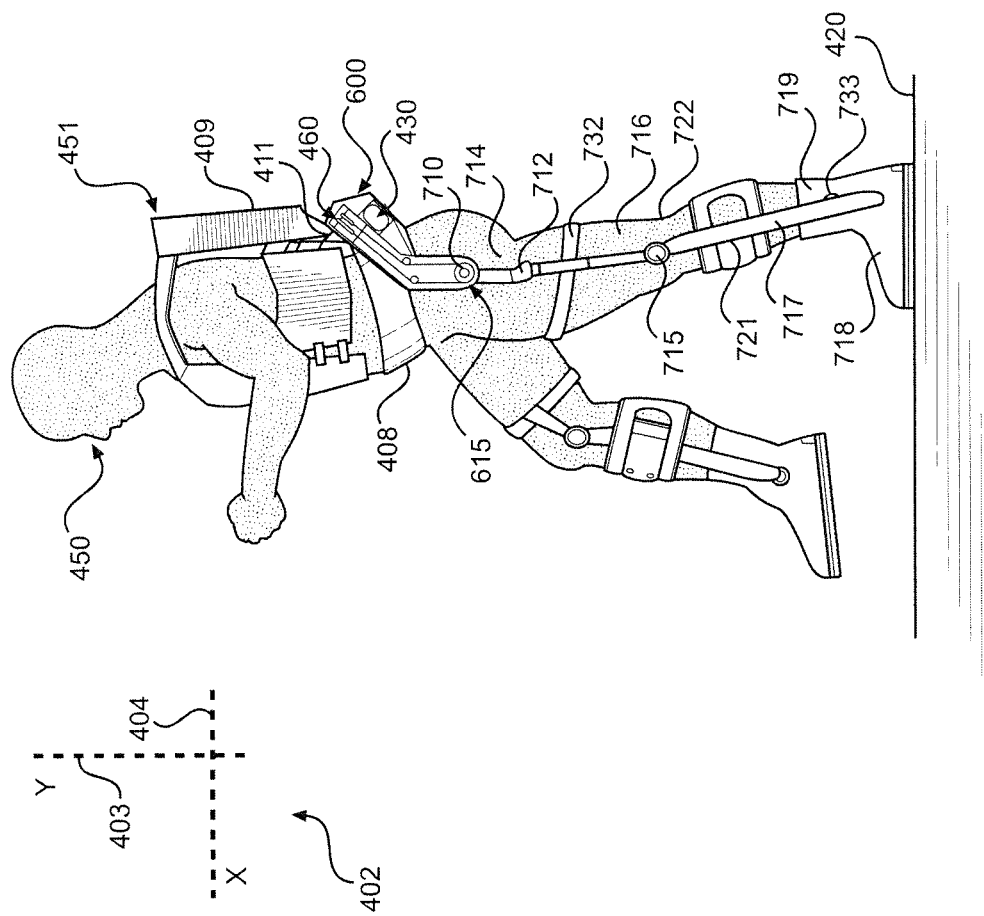
FIG. 5B is a side view of a person wearing an exoskeleton equipped with the hip actuation device of the fourth embodiment showing a cutaway view of the internal components of the hip actuation device.
Figure 5C:
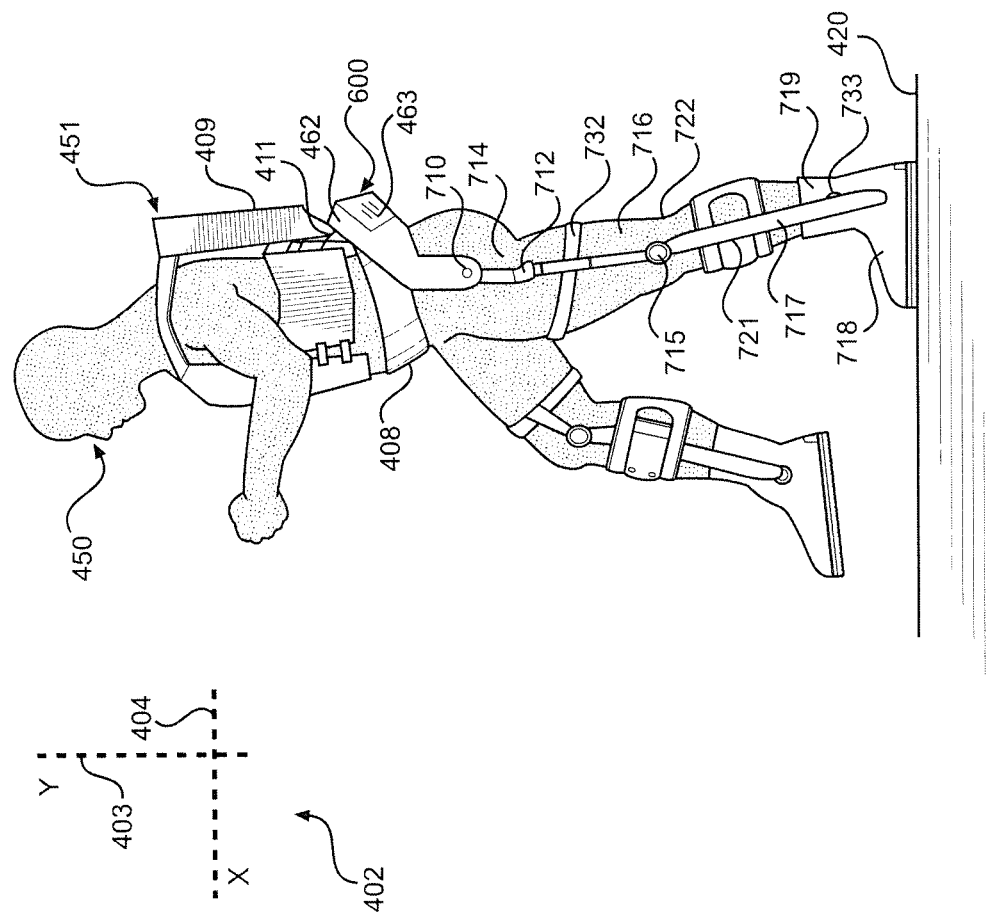
FIG. 5C is a side view of the person and exoskeleton of FIG. 4B.

The fourth embodiment of the present invention is shown in FIGS. 5A-C. The fourth embodiment is very similar but not identical to the third embodiment of the present invention. To provide power to both hips, and to make the actuation devices highly compact at the back of the exoskeleton, the electric motor and ball screw actuators are configured in an over-under configuration in the device of the fourth embodiment. However, each individual actuator functions in a manner identical to that described in the third embodiment. FIG. 5A is a rear view of a dual leg hip actuator device 600, with dual leg hip actuator device 600 including hip actuator 430 and a hip actuator 460 as the right and left hip actuators, respectively. Left hip actuator 460 has a motor 602, a ball screw 601, a ball nut assembly 603, a ball nut stop 640, a cord 605, a cord 625, a guide pulley 611, a guide pulley 624, and a guide pulley 635. Additional components of left hip actuator 460 are not shown in this figure, although left hip actuator 460 is constructed in the same manner as right hip actuator 430 (described in connection with the third embodiment) except that left hip actuator 460 is designed for the left hip rather than the right hip.

With reference to FIGS. 5B and 5C, a person 450 is wearing an exoskeleton 451. Exoskeleton 451 includes torso brace 409, with torso brace 409 connecting to rear mount 411, and with rear mount 411 connecting to strapping 408 and dual leg hip actuator device 600. Dual leg hip actuator device 600 includes right hip actuator 430 and left hip actuator 460, as shown in FIG. 5B. Dual leg hip actuator device 600 also includes a cover 462 and vents 463, as shown in FIG. 5C. Left hip actuator 460 is rotatably connected to an upper leg support 712 at a hip joint 710, with upper leg support 712 being rotatably connected to a lower leg support 717 at a knee joint 715, and with lower leg support 717 being rotatably connected to a boot 718 by an ankle joint 733. Hip joint 710 is collocated with a hip 714 of person 450, knee joint 715 is collocated with a knee 716 of person 450, and ankle joint 733 is collocated with an ankle 719 of person 450. Upper leg support 712 and lower leg support 717 are selectively coupled to a leg 722 of person 450 by thigh strapping 732 and shank strapping 721, respectively. The weight of exoskeleton 451 is transferred around person 450, with the weight of torso brace 409 passing through rear mount 411 to dual leg hip actuator device 600, through upper leg support 712 to lower leg support 717, to boot 718, and ultimately into support surface 420. Similar to what is seen in the third embodiment of the present invention, motor-effected movement of ball nut assembly 603 to the left along Z-axis 406 (shown in FIG. 5A) results in counterclockwise rotation of a joint pulley 615 in X-Y plane 402 (shown in FIG. 5B). This causes extension of upper leg support 712 of exoskeleton 451 at hip joint 710 and extension of leg 722 of person 450 at hip 714 (shown in FIGS. 5B and 5C). Conversely, if motor 602 were to drive ball screw 601 in the opposite direction, motor-effected movement of ball nut assembly 603 to the right along Z-axis 406 (shown in FIG. 5A) results in clockwise rotation of joint pulley 615 in X-Y plane 402 (shown in FIG. 5B). This causes flexion of upper leg support 712 of exoskeleton 451 at hip joint 710 and flexion of leg 722 of person 450 at hip 714 (shown in FIGS. 5B and 5C). In some embodiments, the positions of the upper and lower linear actuators are swapped (i.e., right hip actuator 430 is located above left hip actuator 460).

As an example of the fourth embodiment of the present invention, consider a soldier wearing a powered exoskeleton in a combat environment, with this exoskeleton providing power to the joints of the exoskeleton that are involved in exoskeleton walking. If this exoskeleton were equipped with the dual hip actuator device of the fourth embodiment, power could be provided to each hip joint of the exoskeleton without adding bulk to the joints. This is useful to a person wearing an exoskeleton that needs to move through tight spaces, where bulky joints could snag on obstacles such as walls or brush and obstruct the passage of the exoskeleton. Through use of the device of the fourth embodiment of the exoskeleton hip joint, hip joint bulk would be reduced, improving the mobility and maneuverability of the exoskeleton in tight spaces or cluttered environments. In addition, as the tensile members of the device of the fourth embodiment stabilize the axial position of the ball nut assembly on the ball screw, a heavy precision rail is not required in this type of ball screw linear actuator, reducing the weight and bulk of the actuator and exoskeleton as a whole—with lighter weight being desirable in exoskeletons for reasons including exoskeleton speed and power consumption.

Although the actuator of the present invention is shown being used to cause movement of an exoskeleton hip joint in certain embodiments, it should be recognized that the actuator can be used with other joints. For example, the actuator can be used with elbow joints (not shown), knee joints (e.g., knee joint 415) and ankle joints (e.g., ankle joint 433). In general, the actuator of the present invention causes a first support and a second support to move relative to one another about the joint being actuated. These supports can take the form of a torso brace and an upper leg support (e.g., torso brace 409 and upper leg support 412), an upper leg support and a lower leg support (e.g., upper leg support 412 and lower leg support 417), a lower leg support and a boot (e.g., lower leg support 417 and boot 418) or an upper arm support and a lower arm support (not shown), for instance.

In some embodiments, the various embodiments of the present invention can be combined. In all embodiments, various sensors, including but not limited to pressure sensors or toggle switches, can be in communication with the exoskeleton control system, allowing the exoskeleton to respond to the user. In some embodiments, various types of sensors are used to determine the position of the actuator or joint. In some embodiments, various additional types of sensors are used to detect the forces exerted upon the joint.

In some embodiments, bellows completely or partially enclose ball-screw-mechanism working surfaces to prevent dust or grit contamination of the ball screw mechanism. In some embodiments, the ball screw actuators, cords, guide pulleys, and/or tensile member attachment points are placed differently on the exoskeleton structure. The tensile members can be routed differently across the exoskeleton structure, including the use of devices imparting mechanical advantage. In some embodiments, guide rails can be employed for the ball nut assembly. In still other embodiments, a ball nut with recirculating balls is replaced by a rolling ring drive, and the ball screw is replaced with a "threadless ballscrew" rotating rod drive mechanism. In such an embodiment, the bearings are set at an angle to the threadless rod, with this angle determining the direction and rate of linear motion of the rolling ring drive per revolution of the rod, as driven by the motor.

Based on the above, it should be readily apparent that the present invention provides a device for use in human exoskeletons that allows for force to be exerted on a joint, effecting bidirectional movement of the joint, with this device being located away from the joint. The device is highly efficient at the transfer of force from an electrical motor or other power source to the joint, minimizing energy consumption and/or maximizing force applied to the joint. In addition, the device is low profile and adds little bulk at the joint being powered. The device can incorporate a robust and simple system for force sensing, allowing the exoskeleton control system to accurately control the position and force applied to the joint. Although described with reference to preferred embodiments, it should be readily understood that various changes or modifications could be made to the invention without departing from the spirit thereof. In general, the invention is only intended to be limited by the scope of the following claims.

The invention claimed is:

1. An exoskeleton comprising:
  a first support configured to be coupled to an exoskeleton wearer;
  a second support configured to be coupled to the exoskeleton wearer;
  a joint interconnecting the first support and the second support; and
  an actuator including:
    a ball screw;
    a ball nut assembly coupled to the ball screw for movement along the ball screw; and
    at least two tensile members connected to the ball nut assembly such that first and second portions of the at least two tensile members extend from the ball nut assembly in a first direction and third and fourth portions of the at least two tensile members extend from the ball nut assembly in a second direction opposite the first direction, wherein the first and second portions are located on opposite sides of the ball screw from one another, wherein the third and fourth portions are located on opposite sides of the ball screw from one another, and wherein the actuator is configured such that:
      movement of the ball nut assembly along the ball screw in the first direction causes the second support to move relative to the first support in a first rotational direction about the joint; and
      movement of the ball nut assembly along the ball screw in the second direction causes the second support to move relative to the first support in a second rotational direction about the joint.

2. The exoskeleton of claim 1, wherein:
  the joint includes a joint pulley;
  the joint is configured such that rotation of the joint pulley causes the second support to move relative to the first support about the joint; and
  the at least two tensile members are is connected to the joint pulley.

3. The exoskeleton of claim 2, wherein:
  the at least two tensile members includes a first tensile member and a second tensile member;
  the first tensile member has a first end and a second end;

the first and second ends of the first tensile member are coupled to the joint pulley;
the second tensile member has a first end and a second end; and
the first and second ends of the second tensile member are coupled to the joint pulley.

4. The exoskeleton of claim 1, wherein the actuator further includes:
a first plurality of pulleys configured to guide the first and second portions of the at least two tensile members; and
a second plurality of pulleys configured to guide the third and fourth portions of the at least two tensile members.

5. The exoskeleton of claim 4, wherein the first and second portions of the at least two tensile members run parallel to the ball screw between the ball nut assembly and the first plurality of pulleys, and the third and fourth portions of the at least two tensile members run parallel to the ball screw between the ball nut assembly and the second plurality of pulleys.

6. The exoskeleton of claim 5, wherein the actuator further includes an additional pulley configured to guide the at least two tensile members.

7. The exoskeleton of claim 6, wherein each of the first plurality of pulleys is oriented in a first plane, and the additional pulley is oriented in a second plane.

8. The exoskeleton of claim 1, wherein the ball nut assembly includes a load cell configured to detect a force applied to the ball nut assembly by the at least two tensile members.

9. The exoskeleton of claim 1, wherein the actuator further includes a motor configured to cause rotation of the ball screw.

10. The exoskeleton of claim 1, wherein:
the first support is a torso brace;
the second support is an upper leg support; and
the joint is a hip joint.

11. An exoskeleton joint actuator for an exoskeleton including a first support configured to be coupled to an exoskeleton wearer, a second support configured to be coupled to the exoskeleton wearer and a joint connecting the first support to the second support, the actuator comprising:
a ball screw;
a ball nut assembly coupled to the ball screw for movement along the ball screw; and
at least two tensile members connected to the ball nut assembly such that first and second portions of the at least two tensile members extend from the ball nut assembly in a first direction and third and fourth portions of the at least two tensile members extend from the ball nut assembly in a second direction opposite the first direction, wherein the first and second portions are located on opposite sides of the ball screw from one another, wherein the third and fourth portions are located on opposite sides of the ball screw from one another, and wherein the actuator is configured such that:
movement of the ball nut assembly along the ball screw in the first direction causes the second support to move relative to the first support in a first rotational direction about the joint; and
movement of the ball nut assembly along the ball screw in the second direction causes the second support to move relative to the first support in a second rotational direction about the joint.

12. The exoskeleton joint actuator of claim 11, further comprising:
a first plurality of pulleys configured to guide the first and second portions of the at least two tensile members; and
a second plurality of pulleys configured to guide the third and fourth portions of the at least two tensile members.

13. The exoskeleton joint actuator of claim 12, wherein the first and second portions of the at least two tensile members run parallel to the ball screw between the ball nut assembly and the first plurality of pulleys, and the third and fourth portions of the at least two tensile members run parallel to the ball screw between the ball nut assembly and the second plurality of pulleys.

14. The exoskeleton joint actuator of claim 13, further comprising an additional pulley configured to guide the at least two tensile members.

15. The exoskeleton joint actuator of claim 14, wherein each of the first plurality of pulleys is oriented in a first plane, and the additional pulley is oriented in a second plane.

16. A method for causing movement of an exoskeleton including a first support coupled to an exoskeleton wearer, a second support coupled to the exoskeleton wearer, a joint connecting the first support to the second support and an actuator, the actuator including a ball screw, a ball nut assembly coupled to the ball screw and at least two tensile members, wherein the at least two tensile members are is connected to the ball nut assembly such that first and second portions of the at least two tensile members extend from the ball nut assembly in a first direction and third and fourth portions of the at least two tensile members extend from the ball nut assembly in a second direction opposite the first direction, wherein the first and second portions are located on opposite sides of the ball screw from one another, and wherein the third and fourth portions are located on opposite sides of the ball screw from one another, the method comprising:
moving the ball nut assembly along the ball screw in the first direction to cause the second support to move relative to the first support in a first rotational direction about the joint; and
moving the ball nut assembly along the ball screw in the second direction to cause the second support to move relative to the first support in a second rotational direction about the joint.

17. The method of claim 16, wherein the joint includes a joint pulley, the at least two tensile members includes a first tensile member and a second tensile member, the first tensile member has a first end and a second end coupled to the joint pulley and the second tensile member has a first end and a second end coupled to the joint pulley, the method further comprising rotating the joint pulley to cause the second support to move relative to the first support about the joint.

18. The method of claim 16, further comprising:
guiding the first and second portions of the at least two tensile members with a first plurality of pulleys; and
guiding the third and fourth portions of the at least two tensile members with a second plurality of pulleys.

19. The method of claim 18, further comprising guiding the at least two tensile members with an additional pulley, wherein each of the first plurality of pulleys is oriented in a first plane, and the additional pulley is oriented in a second plane which is distinct from the first plane.

20. The method of claim 16, wherein the ball nut assembly includes a load cell, the method further comprising:
detecting a force applied to the ball nut assembly by the at least two tensile members with the load cell; and
controlling the actuator based on the force.

* * * * *